US012301969B2

(12) United States Patent
Santos et al.

(10) Patent No.: US 12,301,969 B2
(45) Date of Patent: May 13, 2025

(54) MODULAR CAMERA WITH INTERCHANGEABLE IMAGE HEAD AND SUB-SYSTEM BASES

(71) Applicant: GoPro, Inc., San Mateo, CA (US)

(72) Inventors: Adrian Santos, Lake Forest, CA (US); Nicholas Vitale, Foster City, CA (US); Joseph Tucker, Santa Cruz, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/417,397

(22) Filed: Jan. 19, 2024

(65) Prior Publication Data
US 2024/0163541 A1 May 16, 2024

Related U.S. Application Data

(63) Continuation of application No. 18/224,822, filed on Jul. 21, 2023, now Pat. No. 11,882,351, which is a continuation of application No. 17/669,082, filed on Feb. 10, 2022, now Pat. No. 11,711,603.

(51) Int. Cl.
*H04N 5/335* (2011.01)
*H04N 23/54* (2023.01)
*H04N 23/55* (2023.01)
*H04N 23/60* (2023.01)
*H04N 23/663* (2023.01)

(52) U.S. Cl.
CPC ............. *H04N 23/55* (2023.01); *H04N 23/54* (2023.01); *H04N 23/663* (2023.01); *H04N 23/665* (2023.01)

(58) Field of Classification Search
CPC .................................................... H04N 23/663
See application file for complete search history.

(56) References Cited

U.S. PATENT DOCUMENTS

| 5,189,520 | A | 2/1993 | Okayasu |
| 5,917,545 | A | 6/1999 | Kowno |
| 6,138,826 | A | 10/2000 | Kanamori |
| 10,234,748 | B2 * | 3/2019 | Tsuge ........................ G06F 3/16 |
| 10,694,083 | B1 | 6/2020 | Thomas |

(Continued)

OTHER PUBLICATIONS

Gopro, Hero Session, User Manual, 55 pages.
(Continued)

*Primary Examiner* — Gary C Vieaux
(74) *Attorney, Agent, or Firm* — Young Basile Hanlon & MacFarlane, P.C.

(57) ABSTRACT

The present teachings provide an image head with a housing, an integrated sensor and lens assembly (ISLA), a port, and componentry. The housing has a front side a rear side located opposite the front side; a top side located between the front side and the rear side; and a bottom side located opposite the top side and between the front side and the rear side. The ISLA extends from the front side and is configured to detect images. The port is located on the rear side that is configured to electrically connect the image head to a base when the image head is inserted into the base. The internal componentry has a printed circuit board in communication with an integrated sensor of the ISLA and a memory located on the printed circuit board and configured to store the images. The internal componentry controls the image head.

20 Claims, 11 Drawing Sheets

(56) References Cited

U.S. PATENT DOCUMENTS

| | | |
|---|---|---|
| 10,718,996 B2 | 7/2020 | Ramones |
| 11,711,603 B1 | 7/2023 | Santos |
| 11,882,351 B2 | 1/2024 | Santos |
| 2001/0043281 A1 | 11/2001 | Onuki |
| 2002/0101534 A1 | 8/2002 | Liu |
| 2004/0155966 A1* | 8/2004 | Jang .................... H04N 1/2158 |
| | | 348/E5.025 |
| 2005/0140812 A1 | 6/2005 | Yoo |
| 2006/0061663 A1 | 3/2006 | Park |
| 2007/0058972 A1* | 3/2007 | Misawa ................. H04N 23/55 |
| | | 348/E5.026 |
| 2007/0071423 A1 | 3/2007 | Fantone |
| 2007/0077062 A1* | 4/2007 | Senba .................. H04N 23/663 |
| | | 396/529 |
| 2007/0086778 A1* | 4/2007 | Tanaka ................. H04N 23/651 |
| | | 348/E5.042 |
| 2009/0316038 A1 | 12/2009 | Schmack |
| 2010/0165188 A1 | 7/2010 | Jannard |
| 2011/0298970 A1 | 12/2011 | Shinohara |
| 2013/0235261 A1* | 9/2013 | Berkner ............... H04N 23/663 |
| | | 348/E5.026 |
| 2014/0132781 A1* | 5/2014 | Adams ................ H04N 23/663 |
| | | 348/207.1 |
| 2014/0140687 A1 | 5/2014 | Otani |
| 2019/0014319 A1 | 1/2019 | Jannard |
| 2020/0029001 A1* | 1/2020 | Franke ................. H04N 23/663 |
| 2020/0201144 A1* | 6/2020 | Ramones ......... G08B 13/19619 |
| 2023/0254560 A1 | 8/2023 | Santos |
| 2023/0370706 A1 | 11/2023 | Santos |

OTHER PUBLICATIONS

Insta360 One R, Interchangeable lens Action Camera, https://www.insta360.com/product/insta360-oner_1inch-edition, printed Dec. 15, 2021, 25 pages.

Insta360, Basic Operation, https://onlinemanual.insta360.com/oner/en-us/camera/basic, printed Dec. 16, 2021, 10 pages.

\* cited by examiner

MODULAR CAMERA WITH INTERCHANGEABLE IMAGE HEAD AND SUB-SYSTEM BASES

CROSS-REFERENCE TO RELATED APPLICATION(S)

This application is a continuation of U.S. patent application Ser. No. 18/224,822, filed Jul. 21, 2023, which is a continuation of U.S. patent application Ser. No. 17/669,082, filed Feb. 10, 2022, now U.S. Pat. No. 11,711,603, the entire disclosures of which are hereby incorporated by reference.

TECHNICAL FIELD

This disclosure relates to a modular camera with an image head that may be swapped between multiple different sub-system bases. The image head includes internal componentry such that additional internal componentry is not needed in the sub-system bases to generate images.

BACKGROUND

Generally, image capture devices are available that are capable of capturing both images and videos. These image capture devices may include lenses that may be changed in order to change a field of view, increase or decrease magnification, or otherwise enhance image capture for the image capture devices. Thus, a user may select a lens and place a different lens on an image capture device to create a desired effect.

SUMMARY

Disclosed herein are implementations of an apparatus where an image head including internal image generating componentry is switchable between multiple different sub-system bases. These different sub-system bases may be selected depending upon a desired activity of a user.

An image head includes a housing, side rails, a port, and internal componentry. The housing includes a first side and a second side located opposite the second side. The side rails are located on or within the first side, the second side, or both and the side rails are configured to provide sliding directional control of the image head when connecting to a base. The port configured to electrically connect the image head to the base. The internal componentry includes: a printed circuit board; an integrated sensor and lens assembly (ISLA) configured to detect an image; and memory located on the printed circuit board configured to store the image.

An image capture device comprises a base and an image head. The base comprises a cavity. The image head comprises: a housing. The housing comprises: a first side; a second side located opposite the second side, and side rails located on or within the first side, the second side, or both. The side rails are configured to slidingly connect the image head within the cavity of the base. The image head comprises a port configured to electrically connect the image head to the base. The internal componentry comprises: a printed circuit board; and an integrated sensor and lens assembly (ISLA) configured to detect an image. The base is free of any circuitry that generates or stores an image.

An image capture device comprises a base and an image head. The base comprises a power source; an image generation button; and a cavity. The image head comprises a housing, side rails, a port, and internal componentry. The housing comprises: a first side; a second side located opposite the second side. The side rails are located on or within the first side and the second side, the side rails configured to assist the image head into a mating connection as the image head extends into the cavity in the base. The port is configured to electrically connect the image head to the base as the image head extends into the cavity of the base. The internal componentry comprises: a printed circuit board; and an integrated sensor and lens assembly (ISLA) configured to detect an image.

The present teachings provide an image head including a housing, side rails, and internal componentry. The housing includes a first side, and a second side located opposite the second side. The side rails extending along the first side, the second side, or both, wherein the side rails are recesses that are configured to receive a track of a base to provide sliding directional control of the image head when connecting to the base. A port configured to electrically connect the image head to the base, wherein the port is recessed in the housing. The internal componentry includes a printed circuit board, an integrated sensor and lens assembly (ISLA) configured to detect images, and memory located on the printed circuit board configured to store the images.

The present teachings provide an image capture device including a base, an image head, and internal componentry. The base includes a cavity. The image head includes a housing with a first side and a second side located opposite the second side. The housing includes side rails extending along the first side and the second side, the side rails configured to slidingly connect to tracks of the image head so that the image head is movable into the cavity of the base. The image capture device includes a port configured to electrically connect the image head to the base. The internal componentry includes a printed circuit board; and an integrated sensor and lens assembly (ISLA) configured to detect images. The base is free of any circuitry that generates or stores an image.

The present teachings provide an image capture device that includes a base and an image head. The base includes a power source; an image generation button; a cavity; and tracks located within the cavity. The image head includes a housing, side rails, a port, and internal componentry. The housing includes a first side and a second side located opposite the first side. The side rails extend parallel to one another from a rear end towards a forward end along the first side, the second side, or both, wherein the side rails are configured to form a mating connection with the tracks as the image head extends into the cavity in the base. The port is configured to electrically connect the image head to the base as the image head extends into the cavity of the base. The internal componentry includes a printed circuit board; and an integrated sensor and lens assembly (ISLA) configured to detect an image.

The present teachings provide an image head with a housing, an integrated sensor and lens assembly (ISLA), a port, and internal componentry. The housing has a front side; a rear side; a top side; and a bottom side. The ISLA extends from the front side and is configured to detect images. The port is located on the rear side that is configured to electrically connect the image head to a base when the image head is inserted into the base. The internal componentry includes: a first microphone located within the front side below the ISLA; a second microphone located within the top side of the housing; a speaker located at the bottom side of the housing; a printed circuit board in communication with the integrated sensor of the ISLA; and a memory located on the printed circuit board and configured to store the images.

The present teachings provide an image capture device with a base and an image head. The base has a cavity and an internal port located within the cavity. The image head has a housing, a port, and internal componentry. The housing has a first side and a second side located opposite the first side. The port is configured to electrically connect the image head to internal port of the base, wherein the port is located on the second side of the housing. The internal componentry has a printed circuit board; an integrated sensor and lens assembly (ISLA) configured to detect images, wherein the ISLA extends through the first side of the housing; a microphone located within the first side below the ISLA; and a memory located on the printed circuit board and configured to store the images. The base is free of any circuitry that generates an image.

The present teachings provide an image capture device with a base and an image head. The base includes a power source; an image generation button; a cavity; an internal port located within the cavity; and a locking switch located within the cavity adjacent to the internal port. The image head includes a housing, a port, a latch, and internal componentry. The housing has a first side and a second side located opposite the first side. The port is configured to electrically connect the image head to internal port of the base, wherein the port is located on the second side of the housing. The latch is located on the second side of the housing and configured to removably connect to the locking switch when the image head is inserted into the cavity. The internal componentry includes a printed circuit board; an integrated sensor and lens assembly (ISLA) configured to detect images, wherein the ISLA extends through the first side of the housing; a microphone located within the first side below the ISLA; and a memory located on the printed circuit board and configured to store the images.

The present teachings provide an image head with a housing, an integrated sensor and lens assembly (ISLA), a port, and componentry. The housing has a front side; a rear side located opposite the front side; a top side located between the front side and the rear side; and a bottom side located opposite the top side and between the front side and the rear side. The ISLA extends from the front side and is configured to detect images. The port is located on the rear side that is configured to electrically connect the image head to a base when the image head is inserted into the base. The internal componentry has a printed circuit board in communication with the integrated sensor of the ISLA; and a memory located on the printed circuit board and configured to store the images. The internal componentry controls the image head.

The present teachings provide an image capture device with a base and am image head. The base has a cavity and a speaker. The cavity has an internal port located within the cavity. The speaker is located adjacent to the cavity. The image head has a port and internal componentry. The housing has a first side and a second side located opposite the first side. The port is configured to electrically connect the image head to internal port of the base, wherein the port is located on the second side of the housing. The internal componentry includes a printed circuit board; an integrated sensor and lens assembly (ISLA) configured to detect images, wherein the ISLA extends through the first side of the housing; and a memory located on the printed circuit board and configured to store the images. The base is free of any circuitry that detects the images.

The present teachings provide an image capture device with a base and an image head. The base includes a power source; a shutter button; a cavity; a speaker located on a different wall of the base than the cavity; an internal port located within the cavity; and a locking switch located within the cavity adjacent to the internal port. The image head has a housing, a port, a latch, and internal componentry. The housing has a first side and a second side located opposite the first side. The port configured to electrically connect the image head to the internal port of the base, wherein the port is located on the second side of the housing. The latch located on the second side of the housing and configured to removably connect to the locking switch when the image head is inserted into the cavity. Internal componentry includes a printed circuit board, an integrated sensor and lens assembly (ISLA), and memory. The ISLA is configured to detect images, wherein the ISLA extends through the first side of the housing. The memory is located on the printed circuit board and configured to store the images.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present teachings provide an image capture device that captures videos and audio related to the video. The image capture device includes an image head that may be switched between multiple sub-system bases. The image head contains substantially all of the internal componentry necessary to generate images, videos, or both. The image head is swappable between all of the sub-system bases. Each of the sub-system bases included different functionality depending upon the desire of the user. The sub-system bases receive the image head and when the image head is installed images may be generated.

Figure 1A:
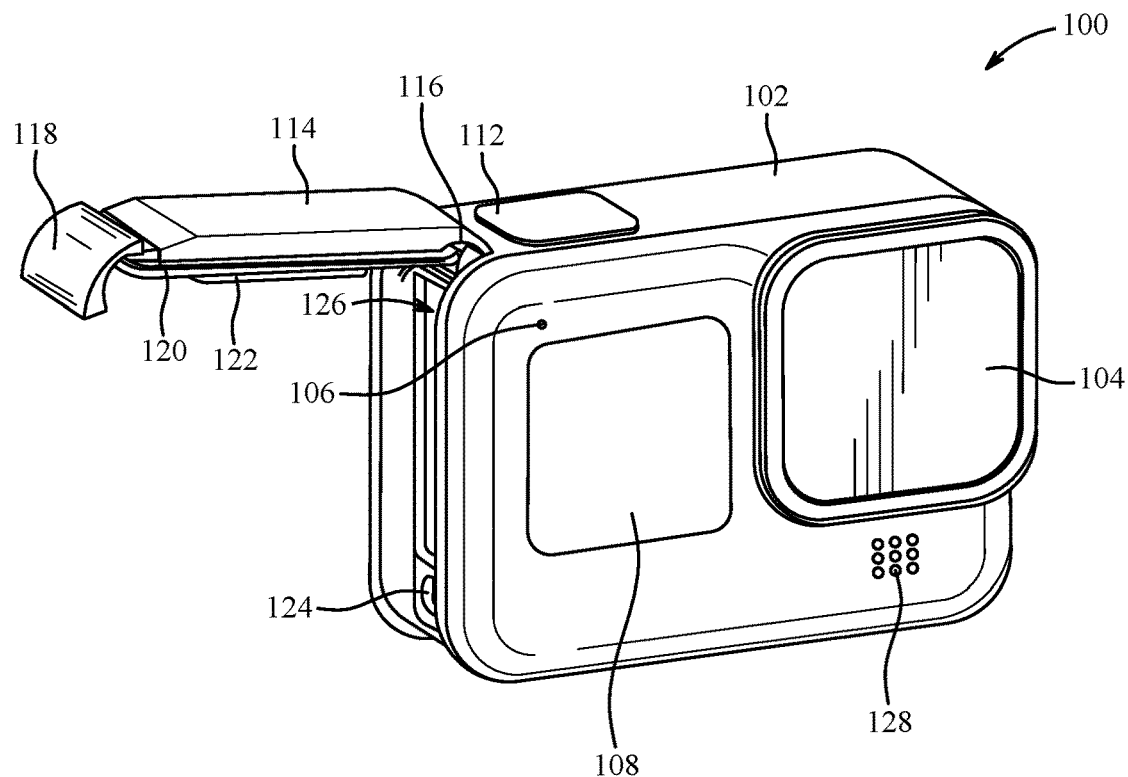
FIGS. 1A-B are isometric views of an example of an image capture device.
Figure 1B:
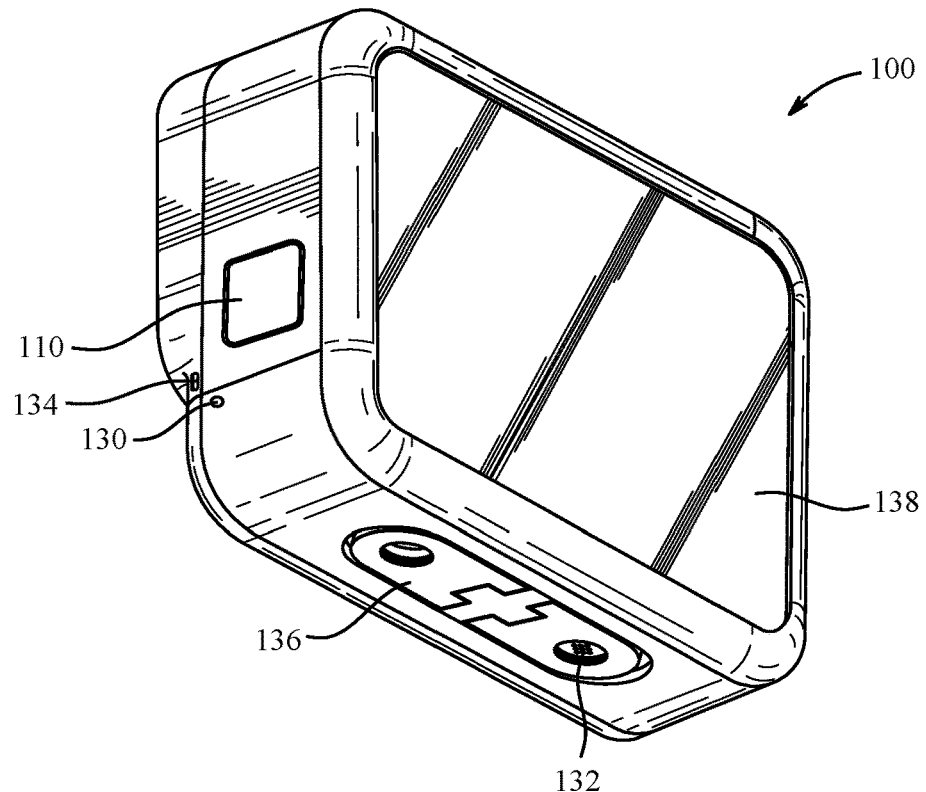

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2:
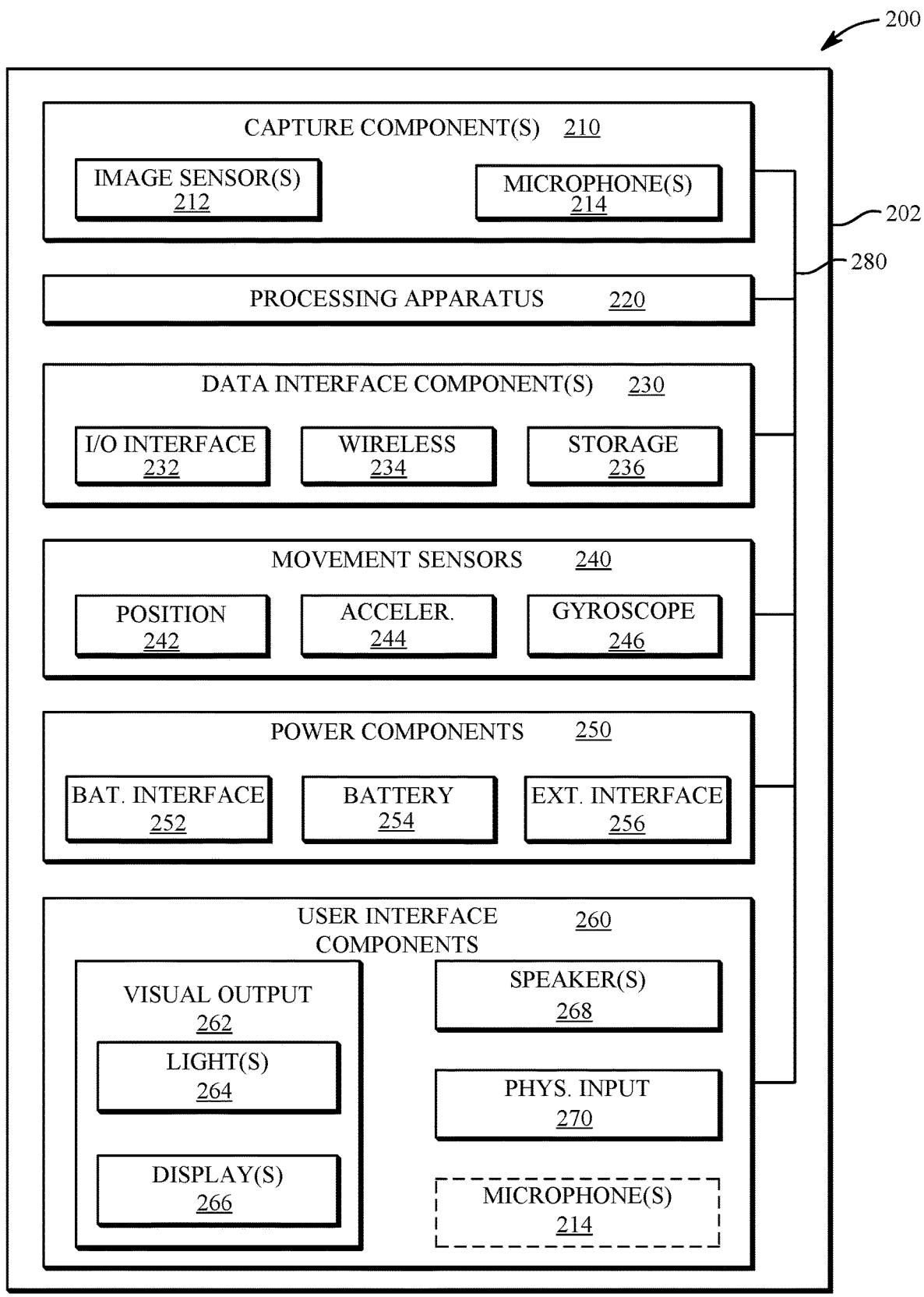
FIG. 2 is a block diagram of electronic components of an image capture device.

FIG. 2 is a block diagram of electronic components in an image capture device 200. The image capture device 200 may be a single-lens image capture device, a multi-lens image capture device, or variations thereof, including an image capture device with multiple capabilities such as use of interchangeable integrated sensor lens assemblies. The description of the image capture device 200 is also applicable to the image capture device 100 of FIGS. 1A-B.

The image capture device 200 includes a body 202 which includes electronic components such as capture components 210, a processing apparatus 220, data interface components 230, movement sensors 240, power components 250, and/or user interface components 260.

The capture components 210 include one or more image sensors 212 for capturing images and one or more microphones 214 for capturing audio.

The image sensor(s) 212 is configured to detect light of a certain spectrum (e.g., the visible spectrum or the infrared spectrum) and convey information constituting an image as electrical signals (e.g., analog or digital signals). The image sensor(s) 212 detects light incident through a lens coupled or connected to the body 202. The image sensor(s) 212 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 212 may be passed to other electronic components of the image capture device 200 via a bus 280, such as to the processing apparatus 220. In some implementations, the image sensor(s) 212 includes a digital-to-analog converter. A multi-lens variation of the image capture device 200 can include multiple image sensors 212.

The microphone(s) 214 is configured to detect sound, which may be recorded in conjunction with capturing images to form a video. The microphone(s) 214 may also detect sound in order to receive audible commands to control the image capture device 200.

The processing apparatus 220 may be configured to perform image signal processing (e.g., filtering, tone mapping, stitching, and/or encoding) to generate output images based on image data from the image sensor(s) 212. The processing apparatus 220 may include one or more processors having single or multiple processing cores. In some implementations, the processing apparatus 220 may include an application specific integrated circuit (ASIC). For example, the processing apparatus 220 may include a custom image signal processor. The processing apparatus 220 may exchange data (e.g., image data) with other components of the image capture device 200, such as the image sensor(s) 212, via the bus 280.

The processing apparatus 220 may include memory, such as a random-access memory (RAM) device, flash memory, or another suitable type of storage device, such as a non-transitory computer-readable memory. The memory of the processing apparatus 220 may include executable instructions and data that can be accessed by one or more processors of the processing apparatus 220. For example, the processing apparatus 220 may include one or more dynamic random-access memory (DRAM) modules, such as double data rate synchronous dynamic random-access memory (DDR SDRAM). In some implementations, the processing apparatus 220 may include a digital signal processor (DSP). More than one processing apparatus may also be present or associated with the image capture device 200.

The data interface components 230 enable communication between the image capture device 200 and other electronic devices, such as a remote control, a smartphone, a tablet computer, a laptop computer, a desktop computer, or a storage device. For example, the data interface components 230 may be used to receive commands to operate the image capture device 200, transfer image data to other electronic devices, and/or transfer other signals or information to and from the image capture device 200. The data interface components 230 may be configured for wired and/or wireless communication. For example, the data interface components 230 may include an I/O interface 232 that provides wired communication for the image capture device, which may be a USB interface (e.g., USB type-C), a high-definition multimedia interface (HDMI), or a FireWire interface. The data interface components 230 may include a wireless data interface 234 that provides wireless communication for the image capture device 200, such as a Bluetooth interface, a ZigBee interface, and/or a Wi-Fi interface. The data interface components 230 may include a storage interface 236, such as a memory card slot configured to receive and operatively couple to a storage device (e.g., a memory card) for data transfer with the image capture device 200 (e.g., for storing captured images and/or recorded audio and video).

The movement sensors 240 may detect the position and movement of the image capture device 200. The movement sensors 240 may include a position sensor 242, an accelerometer 244, or a gyroscope 246. The position sensor 242, such as a global positioning system (GPS) sensor, is used to determine a position of the image capture device 200. The accelerometer 244, such as a three-axis accelerometer, measures linear motion (e.g., linear acceleration) of the image capture device 200. The gyroscope 246, such as a three-axis gyroscope, measures rotational motion (e.g., rate of rotation) of the image capture device 200. Other types of movement sensors 240 may also be present or associated with the image capture device 200.

The power components 250 may receive, store, and/or provide power for operating the image capture device 200. The power components 250 may include a battery interface 252 and a battery 254. The battery interface 252 operatively couples to the battery 254, for example, with conductive contacts to transfer power from the battery 254 to the other electronic components of the image capture device 200. The power components 250 may also include an external interface 256, and the power components 250 may, via the external interface 256, receive power from an external source, such as a wall plug or external battery, for operating the image capture device 200 and/or charging the battery 254 of the image capture device 200. In some implementations, the external interface 256 may be the I/O interface 232. In such an implementation, the I/O interface 232 may enable the power components 250 to receive power from an external source over a wired data interface component (e.g., a USB type-C cable).

The user interface components 260 may allow the user to interact with the image capture device 200, for example, providing outputs to the user and receiving inputs from the user. The user interface components 260 may include visual output components 262 to visually communicate information and/or present captured images to the user. The visual output components 262 may include one or more lights 264 and/or more displays 266. The display(s) 266 may be configured as a touch screen that receives inputs from the user. The user interface components 260 may also include one or more speakers 268. The speaker(s) 268 can function as an audio output component that audibly communicates information and/or presents recorded audio to the user. The user interface components 260 may also include one or more physical input interfaces 270 that are physically manipulated by the user to provide input to the image capture device 200. The physical input interfaces 270 may, for example, be configured as buttons, toggles, or switches. The user interface components 260 may also be considered to include the microphone(s) 214, as indicated in dotted line, and the microphone(s) 214 may function to receive audio inputs from the user, such as voice commands.

The image capture devices 100, 200 may be configured in the form of an image head and may connect with various form factor sub-system bases as described in FIGS. 3A-6F.

Figure 3A:
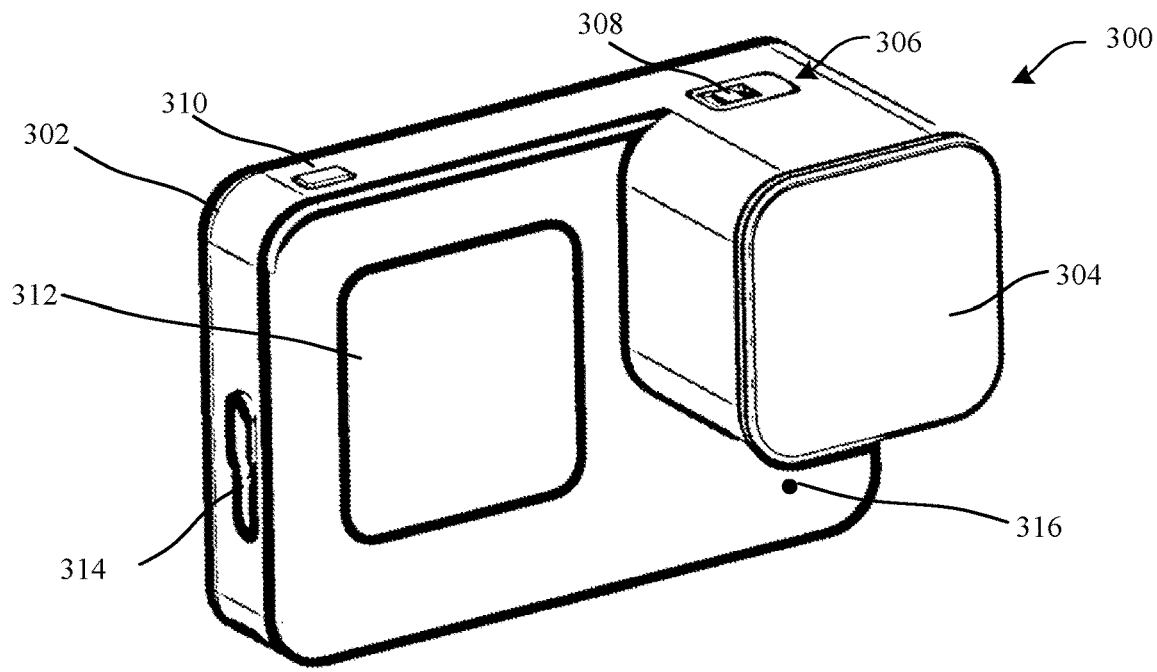
FIG. 3A is a front isometric view of an image head located within a phone like form factor sub-system base.

FIG. 3A is a front isometric view of an image capture device 300. The image capture device 300 includes a base 302 which as shown has a phone-like form factor (i.e., a base, a sub-system base, or phone-like base) and an image head 304. A locking switch cover 306 includes a locking switch 308 that removably connects the image head 304 within the base 302. For example, when a user desires to remove the image head 304 from the base 302, the user moves or otherwise engages the locking switch 308 so that the image head 304 may be pulled out of the base 302.

The base 302 includes a shutter button 310 that upon actuation can activate the image head 304 so that the image head 304 detects, generates, and/or otherwise captures an image (not shown). The image may be previewed on a front screen 312 before the image is saved or the image may be shown on the front screen 312 after the shutter button 310 is actuated. The front screen 312 may be used in a "selfie" mode or to show a user or subject of the image that the image has been or is being generated.

The base 302 includes one or more ports 314. The ports 314 may be connected to one or more internal components of the base 302, the image head 304, or both. The ports 314 may be configured to support transfer of power, data, or both. The ports 314 may support charging internal batteries (e.g., one or more or two or more batteries). The ports 314 may provide access to data in the memory, receive data from the memory, or both. The ports 314 may be a USB, micro-USB, USB-A, USB-B, USB-C, an XLR, RCA, AC/DC power converter, or a combination thereof. The base 302 may have multiple different ports 314 that each provide some different function or connect to a different part of the image capture device 300.

The base 302 may include one or more microphones 316. The microphone 316 on the front surface is located below the image head 304. The microphones 316 assist collecting sounds and noises produced while in video mode. The microphones 316 may include one or more, two or more, or three or more microphones. The microphones 316 may be located on a top, bottom, front, left, right, back, or a combination of sides of the image capture device 300.

Figure 3B:
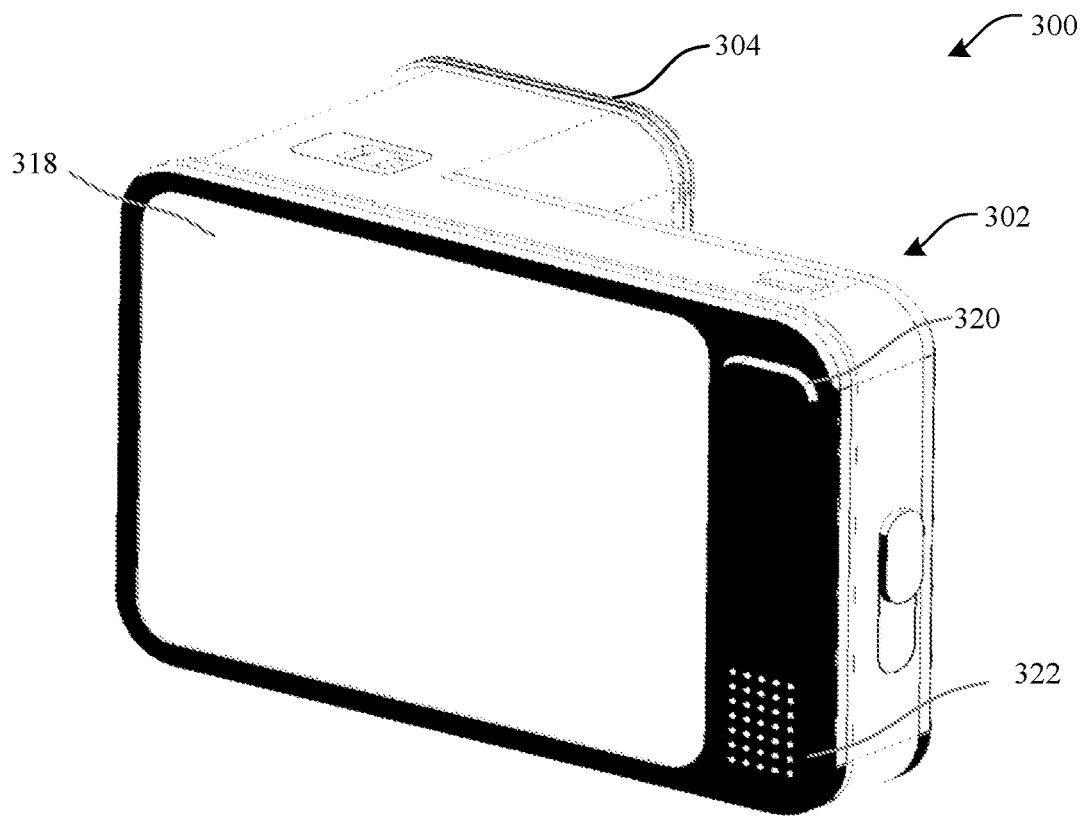
FIG. 3B is a rear isometric view of the image head and the phone like form factor sub-system base of FIG. 3A.

FIG. 3B is a rear isometric view of the image capture device 300. The rear surface of the base 302 is shown with the image head 304 facing away from the viewer. A majority (e.g., 60 percent or more, 75 percent or more, 85 percent or more, or 90 percent or more by area) of the rear surface of the base 302 is covered by a rear screen 318. The rear screen 318 may be used to preview images previously generated, preview images being generated, review memory settings, review system settings, review mode settings, or a combination thereof. The rear screen 318 may show a user what is in the view of the image head 304. A user may actuate a toggle 320 to control contents of the rear screen 318.

The toggle 320 is a button that permits a user to select an item from a menu, a bar, a window, a tab, or a combination thereof. The toggle 320 may move from bar to bar, window to window, tab to tab, option to option, or a combination thereof. The toggle 320 may change from picture to picture. The toggle 320 may allow the user to change modes, adjust settings, adjust volume, or a combination thereof. The toggle 320 may control the image capture device 300. The toggle 320 may be an arrow button, an enter button, a joystick, a capacitive sensor, or a combination thereof. The toggle 320 as shown is located adjacent to a speaker 322.

One or more speakers 322 may produce sounds or replay recorded audio. The speakers 322 may indicate that a recording is in progress, a recording is about to occur, or both. The speakers 322 may replay audio captured during use of the image head 304 (e.g., a video) or relay status information from the image capture device 300. The speakers 322 may be located on any side of the base 302 (e.g., front, back, top, bottom, left, right, or a combination thereof). The base 302 may include one or more speakers, two or more speakers, or even three or more speakers. The speakers 322 may only be located on the rear surface.

The base 302 may include batteries (not shown). The batteries may include one or more batteries or two or more batteries. The batteries may provide sufficient power such that the image capture device 300 may operate for about 100 minutes or more, 200 minutes or more, 300 minutes or more, 350 minutes or more, 500 minutes or more, or 1000 minutes or more. The batteries may be lithium-ion rechargeable batteries.

Figure 3C:
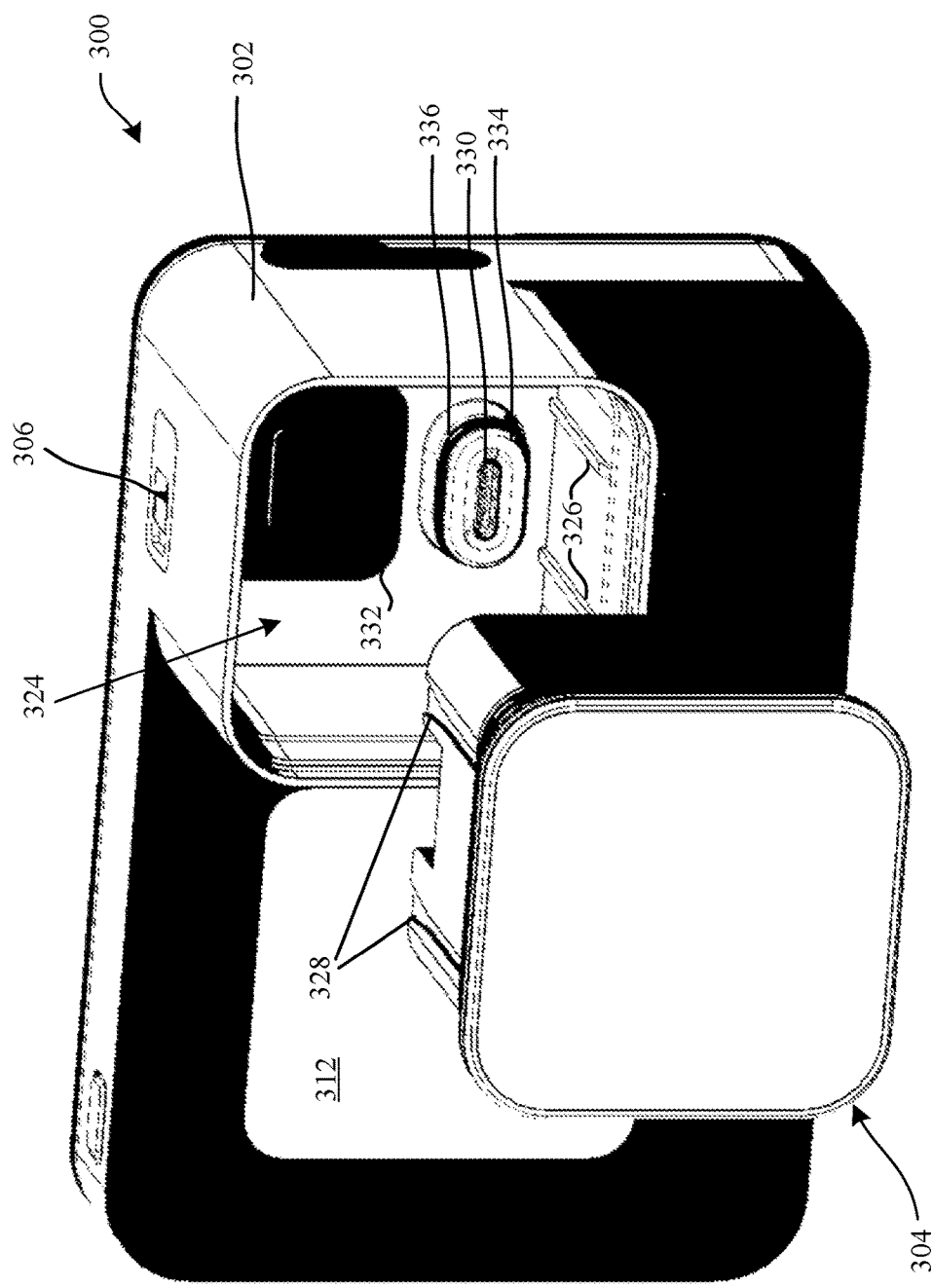
FIG. 3C is a partial exploded view of the image head and the phone like form factor sub-system base of FIG. 3A.

FIG. 3C is a partially exploded view of the image capture device 300 with the image head 304 removed from the base 302. The image head 304 is shown extending out of a cavity 324 in the base 302. The cavity 324 is sized and shaped to fit substantially all of the image head 304. The cavity 324 may form an interference fit with the image head 304 so that a watertight connection is formed. The cavity 324 and the image head 304 are complementary in shape. The cavity 324 and image head 304 may be any shape (e.g., square, rectangular, hexagonal, triangular, oval, round, pentagonal, octagonal, or a combination thereof) such that the cavity 324 and image head 304 are connectable together. The cavity 324 may axially receive the image head 304 and guide the image head 304 into the cavity 324. The cavity 324 includes tracks 326 (lower portions of which are shown) that fit within rails 328 (upper portions of which are shown) on the image head 304.

The tracks 326 and the rails 328 work in conjunction to seat the image head 304 within the cavity 324. The tracks 326 and the rails 328 provide sliding directional control to seat the image head 304 within the cavity 324. The sliding directional control between the tracks 326 and the rails 328 may provide directional support so that a user is not required to provide guidance during movement of the image head 304 into the cavity 324. The tracks 326 and the rails 328 may extend parallel to one another as shown, parallel to an axis of movement of the image head 304, or both. The tracks 326 may include a raised surface that fits within voids, slots, or detents of the rails 328, or vice versa. There may be an equal number of the tracks 326 and the rails 328. One side of the image head 304 may include two rails 328 and the corresponding side of the cavity 324 may also include two tracks 326. The image head 304 and the cavity 324 may have a single track 326 and a single rail 328 that guide the image head 304 into the cavity 324. The rails 328 and the tracks 326 may have flat walls. The rails 328 and the tracks 326 may be "T" shaped so that the image head 304 can only be installed in a certain configuration.

Figure 6A:
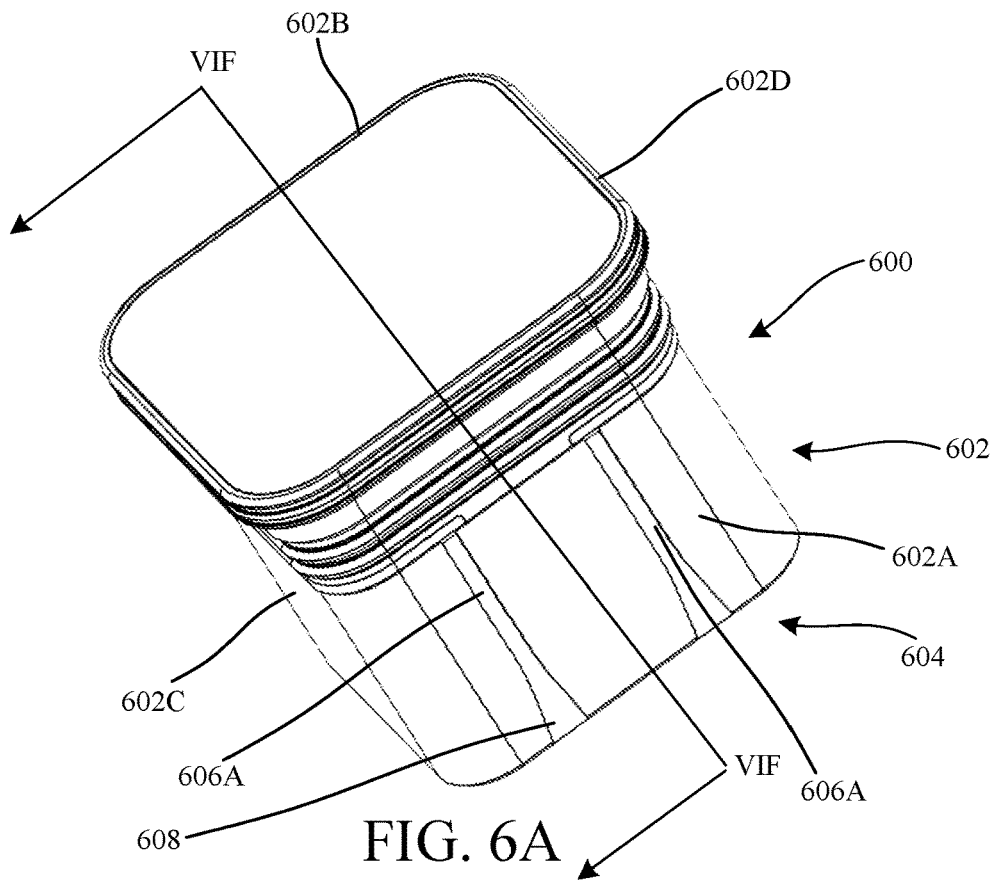
FIG. 6A is an isometric view of a first side of an image head.
Figure 6B:
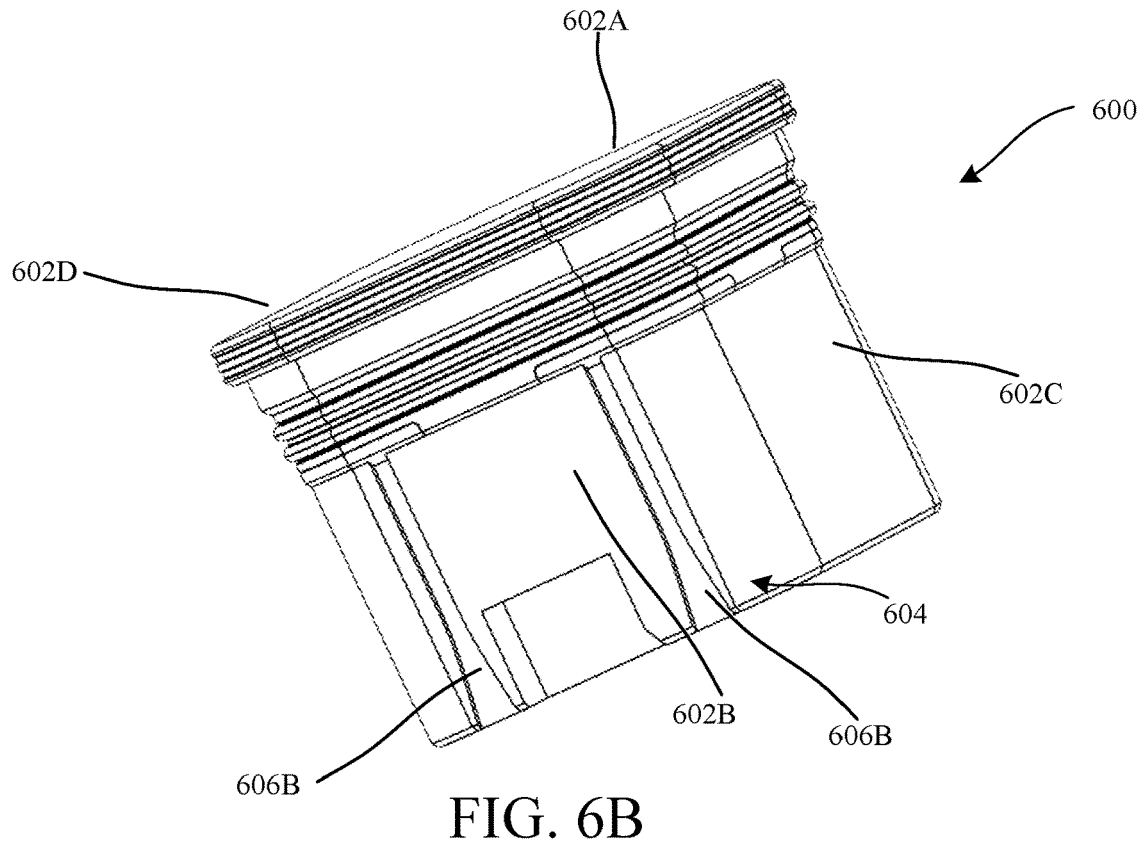
FIG. 6B is an isometric view of a second side of the image head of FIG. 6A with the second side being opposite the first side.

The rails 328 may have a larger opening (e.g., a flare as shown in FIGS. 6A-6B) and taper or narrow as the rails 328 extend from a rear end towards a forward end of the image head 304. The rails 328 may include such a flared entrance or opening to assist in blindly inserting the image head 304 into the cavity 324. For example, as the image head 304 is being inserted into the cavity 324 a user's vision may be restricted such that the user cannot see the rails 328 or the tracks 326 to move the image head 304 accordingly. The rails 328 may include a recess that the tracks 326 fit within. The tracks 326 and the rails 328 guide the image head 304 axially into the cavity 324 within the base 302. The rails 328 may be located on one side. two sides, or more sides of the image head 304. The rails 328 may be located on opposing sides or adjacent sides of the image head 304. The rails 328 may guide the image head 304 into the cavity 324 so that the image head 304 connects to an internal port 330 of the base 302, an internal heat sink 332 of the base 302, or both.

The internal port 330 functions to electrically connect the base 302 and the image head 304. The internal port 330 may provide power to the image head 304. The internal port 330 may provide signals to the front screen 312, the rear screen 318, or both. The internal port 330 and the ports 314 may include a same type of connector and the teachings of the ports 314 are incorporated herein as to the internal port 330. The internal port 330 may have some axial compliance so that the image head 304 may be locked in place by the locking switch 308, be in communication with the heat sink 332, or both. The internal port 330 may be a male connector or a female connector. The internal port 330 may be a USB connector. The internal port 330 may be an opposite connector as a connector (e.g., see USB connector 612 in FIG. 6C) in the image head 304.

The heat sink 332 functions to transfer heat between the base 302 and the image head 304. The heat sink 332 may assist in cooling internal componentry within the image head 304 (see FIGS. 6E-6F). The heat sink 332 is located in the cavity 324 and contacts another heat sink on the image head 304 (e.g., see heat sink 623 in FIG. 6C) to transfer heat between the base 302 and the image head 304. The heat sink 332 distributes heat within the base 302, the image head 304, or both. The heat sink 332 may remove heat from the base 302 and may assist in releasing the heat into an atmosphere around the image capture device 300. A seal on the image head 304 (e.g., see seal 614 in FIG. 6C) may assist in forming a connection between the heat sink 332 and the image head 304.

As the image head 304 extends into the base 302, a seal 334 within the cavity 324 of the base 302 is compressed so that a connection is formed between the internal port 330 and the image head 304 and the seal 334 is compressed until the image head 304 contacts the internal heat sink 332. The seal 334 is a compliant material that may be compressed. The seal 334 may be compliant in one direction (e.g., axially) and rigid in a different direction (e.g., laterally). The seal 334 assists in supporting the internal port 330 so that the internal port 330 electrically connects to the image head 304. The seal 334 may protect the internal port 330 or a region around the internal port 330 so that fluid, debris, or both are prevented from entering the base 302 via the internal port 330. All or a portion of the seal 334 may extend into the image head 304. The seal 334 may be compressed between the image head 3304 and a wall of the base 302 so that a watertight seal is formed. The seal 334 may have some rigidity. The seal 334 may assist in supporting the internal port 330 so that the internal port 330 connects to the image head 304. The seal 334 may be made of virtually any material that is hydrophobic and compliant. The seal 334 may be made of or include silicone, rubber, plastic, a polymer, an elastomer, a closed cell foam, or a combination thereof. The seal 334 may extend through the wall of the base 302 to form a water barrier within the cavity 324. The seal 334 may include a gasket 336.

The gasket 336 functions to form a seal between the internal port 330 and the image head 304. The gasket 336 may extend into a port within the image head 304 (e.g., see port 610 shown in FIG. 6C) and seal the port. The gasket 336 may extend into the port within the image head 304 to prevent fluid from entering into the image head 304. The gasket 336 may extend around all or a portion of the seal 334. The gasket 336 may assist the seal 334 in preventing water ingress into the base 302, the image head 304, or both. The gasket 336 may be made of or include silicone, rubber, plastic, a polymer, an elastomer, a closed cell foam, or a combination thereof. The gasket 336 may be made of a compliant material. The gasket 336 may be made of a material that is softer than the material of the seal 334. The gasket 336 may fit entirely within the port of the image head 304 to prevent fluids from extending into the image head 304.

Figure 4A:
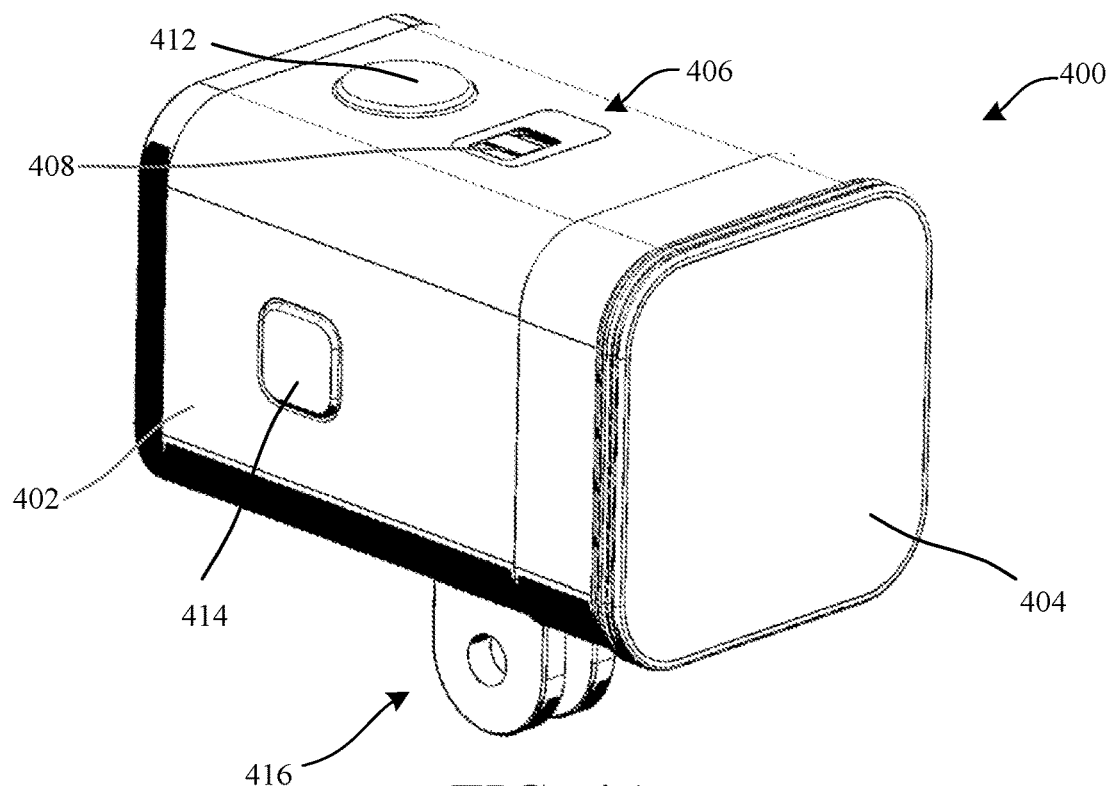
FIG. 4A is front isometric view of the image head located within a rectangular form factor sub-system base.

FIG. 4A is an isometric view of an image capture device 400 shown as a rectangular form factor base 402 (e.g., a base, rectangular base, or a sub-system base) and an image head 404. The rectangular base 402 includes less functionality than the phone-like base 302. The rectangular base 402 may be an intermediate base 402 between the phone-like form factor 302 of FIGS. 3A-3C and a tethered cable form factor 502 of FIGS. 5A-5B. The rectangular base 402 includes a locking switch cover 406 with a locking switch 408 to lock the image head 404 within the rectangular base 402.

The locking switch cover 406 physically connects the image head 404 within the base 402 so that the image head 404 is stowed and locked therein. The locking switch cover 406 further assists in maintaining a sealed connection between the image head 404 and the base 402 so that fluid is prevented from entering the base 402, the image head 404, or both. The locking switch cover 406 may ensure that the image head 404 is installed properly and is maintained in a seated position once located within the base 402. The locking switch cover 406 may include a locking switch 408.

The locking switch 408 may release the image head 404 so that the image head 404 may be removed from the base 402. The locking switch 408 when actuated may release the image head 404. When the locking switch 408 is actuated, a seal 410 (of FIG. 4C) may be free to decompress and axially move the image head 404 at least partially out of the base 402. The locking switch 408 may be laterally movable between a locked position and an unlocked position. The locking switch 408 may slide within a track. During operation, the locking switch 408 is in a locked position so that image head 404 is retained in the base 402. When the image head 404 is locked in the base 402, a shutter button 412 may be depressed to detect, generate, and/or otherwise capture images (not shown).

The shutter button 412 activates the image head 404 so that the image head 404 generates, detects, and/or otherwise captures images. The shutter button 412 may activate the image head 404 so that images or videos are stored on a memory of the image capture device 400. The shutter button 412 may initiate a recording, initiate a display such as display 418 to display a scene of interest from the image head 404, or both. The shutter button 412 may initiate image detection, generation, and/or capturing, and a toggle 414 may control a type of image generated, a mode of generation and/or detection, the image capture device 400, or a combination thereof.

The toggle 414 may control the image capture device 400. The toggle 414 and the toggle 320 of FIGS. 3A to 3C may have similar features and perform the same functions. The toggle 414 may allow a user to review images, change modes, set a timer, delete images, turn power on, turn power off, or a combination thereof. The toggle 414 may change what is displayed to a user, how the image capture device 400 operates, or both. The toggle 414 may switch image modes between a motion mode where the image capture device is moving and a static mode where the image capture device is connected via an interconnect mechanism 416.

The interconnect mechanism 416 may connect the image capture device 400 to a static object, a helmet, a vehicle, a selfie-stick, a tripod, a gimble, any other support device, or a combination thereof. The interconnect mechanism 416 may be a mount. The interconnect mechanism 416 may be movable, static, rotatable, stowable, foldable, or a combination thereof.

Figure 4B:
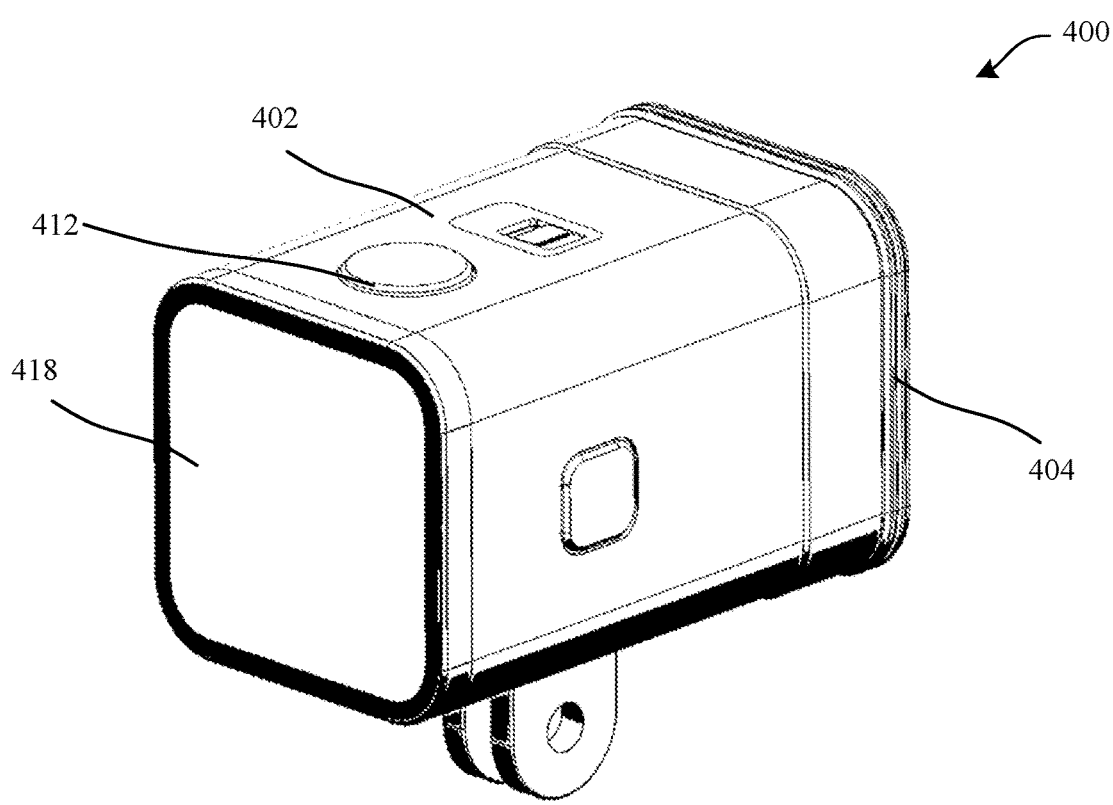
FIG. 4B is a rear isometric view of the image head located within the rectangular form factor sub-system base of FIG. 4A.

FIG. 4B is a rear isometric view of the image capture device 400 of FIG. 4A. The image capture device 400 includes the image head 404 within the base 402 with a display 418 of the base 402 being visible. The display 418 may concurrently show objects in front of the image head 404, modes of operation, saved images, saved videos, a preview of an image, day, time, date, or a combination thereof. The display 418 may be the only display in the rectangular base 402. The display 418 may be an LCD screen. The display 418 may be substantially a same size as a rear wall of the image capture device 400. The display 418 may be changed by pressing the toggle 414. The toggle 414 may control what is shown on the display 418, how the image capture device 400 functions, or both.

Figure 4C:
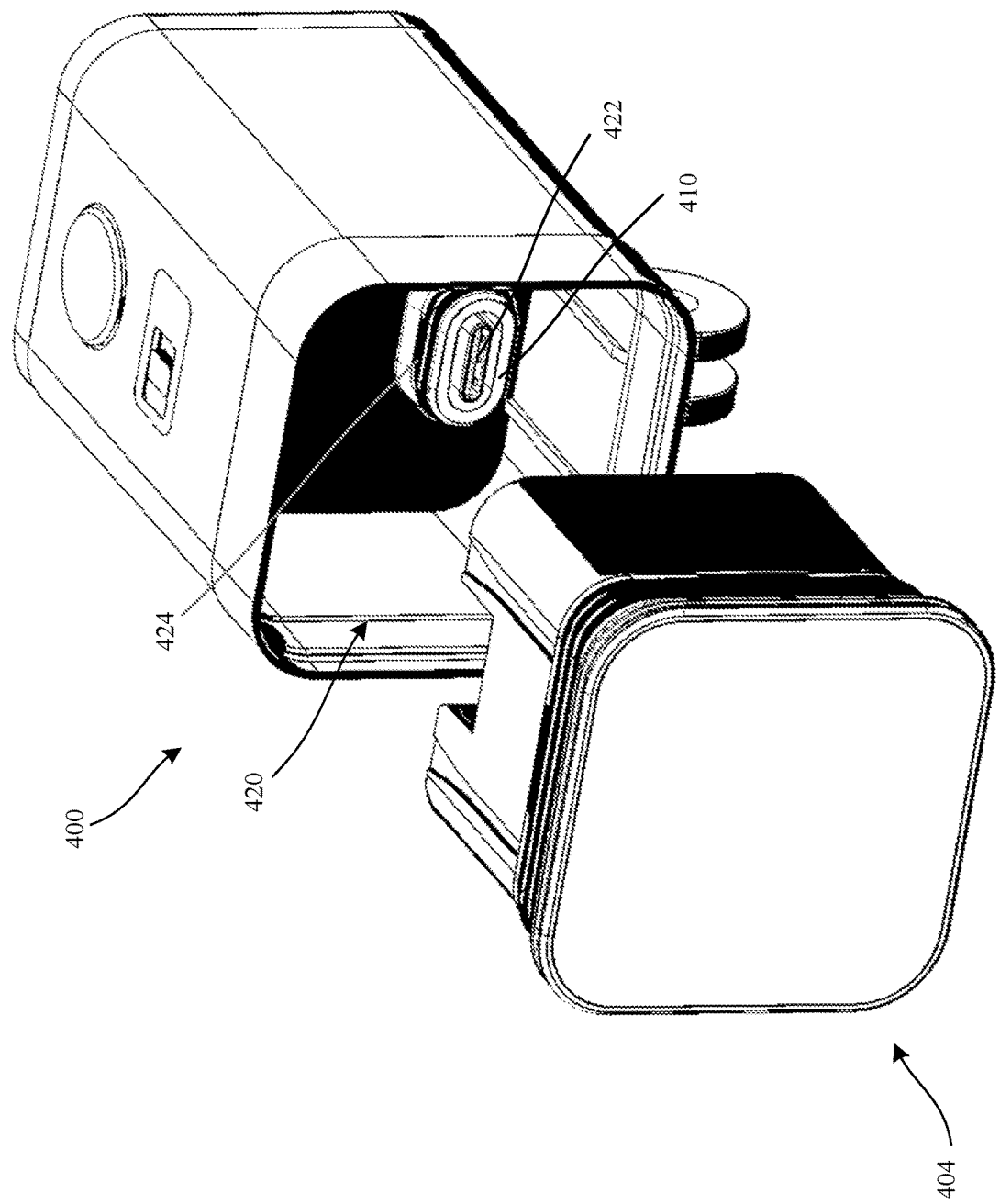
FIG. 4C is a partially exploded view of the image head and the rectangular form factor sub-system base of FIG. 4A.

FIG. 4C is a partially exploded view of the image capture device 400 of FIG. 4A with the image head 404 removed from the base 402. As shown, the image head 404 is removed from a cavity 420 so that an internal port 422, the seal 410, and a gasket 424 are exposed. The cavity 420 of the image capture device 400 includes similar components as the cavity 342 of FIG. 3C. and the teachings of the elements within the cavity 342 are incorporated herein for the cavity 420 of FIG. 4C.

Figure 5A:
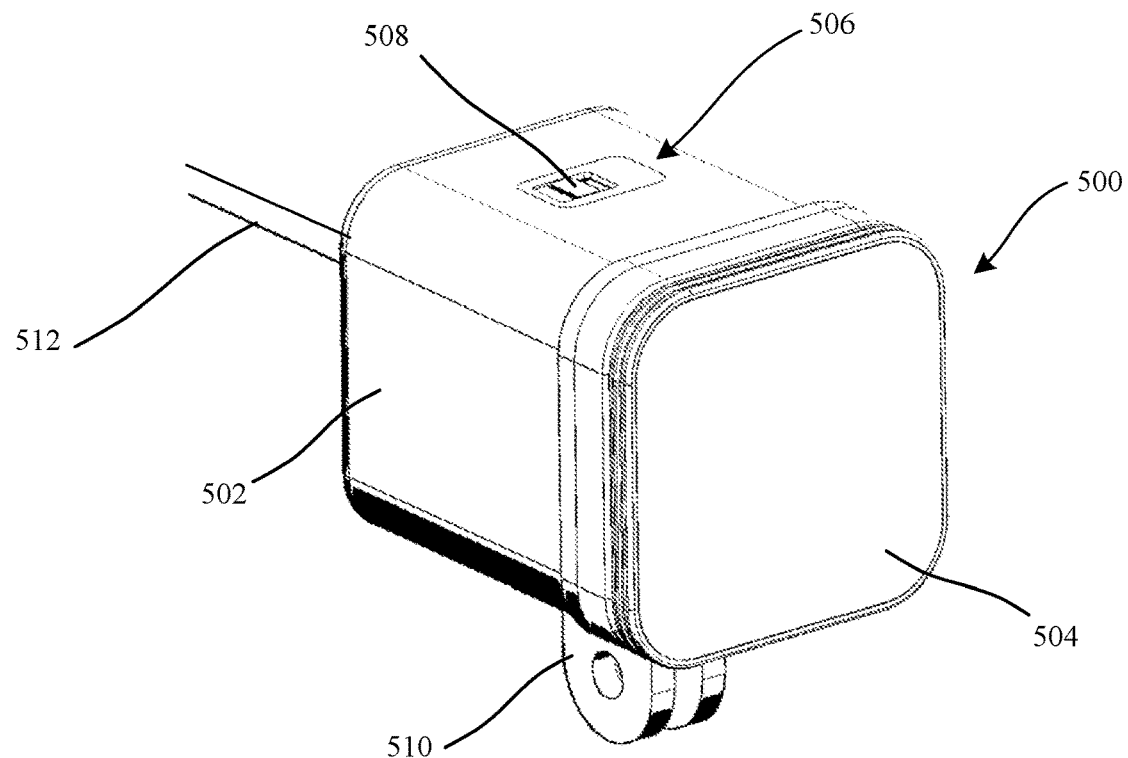
FIG. 5A is a front isometric view of an image head and a tethered cable form factor sub-system base.

FIG. 5A is an isometric view of an image capture device 500. The image capture device 500 includes a tethered cable form factor sub-system base 502 (i.e., tethered base or base) and an image head 504. The base 502 includes a cavity (not shown) that receives that image head 504. The image head 504 may be similar to or the same as the image heads 304, 404 shown in FIGS. 3A-4C, the teachings of which are incorporated herein. The image head 504 is insertable into and removable from the base 502. The image head 504 is locked within the base 502 by a locking switch cover 506. The locking switch cover 506 includes a locking switch 508 that is movable to release the image head 504 so that the image head 504 is removable and may be used in another base 302, 402 taught herein. The locking switch 508 as shown slides from one side to another side to release the image head 504 as was discussed herein with regards to the locking switches 308 and 408.

The image capture device 500 includes an interconnect mechanism 510. The interconnect mechanism 510 assists the image capture device 500 in being mounted. The interconnect mechanism 510 may connect to a helmet, gimble, tripod, camera stand, or any other device used to support an image capture device 500. The interconnect mechanism 510 may be similar to or the same as the interconnect mechanism 416 as taught in FIGS. 4A-4C.

The tethered base 502 includes the least functionality of all of the bases 302,402, or 502 described herein. The tethered base 502 is free of batteries or other internal power sources and receives power via a cord 512. The cord 512 connects the image capture device 500 to a remote power source. The cord 512 may also connect the image capture device 500 for information transfer to other devices that include memory, power, a screen, a processor, a controller, or a combination thereof. For example, the cord 512 may plug into a phone, tablet, computer, exterior controller, or a combination thereof. The tethered base 502, the image head 504, or both may include some memory, some power source, or both so that the image capture device 500 may be temporarily used when the cord 512 is unplugged. The cord 512 may then be used to recharge the power source of the image capture device 500 when plugged back in.

Figure 5B:
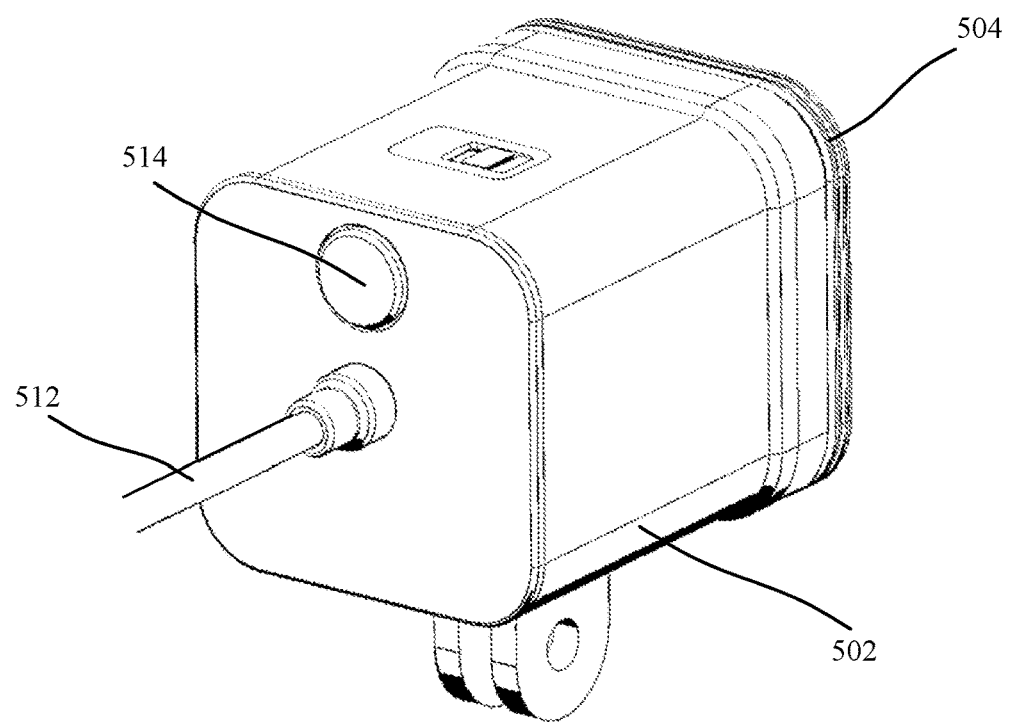
FIG. 5B is a rear isometric view of the image head and the tethered cable form factor sub-system base of FIG. 5A.

FIG. 5B is a rear isometric view of the image capture device 500 of FIG. 5A. The rear view shows the cord 512 extending into the tethered base 502 and a shutter button 514 that activates the image capture device 500. Upon pressing the shutter button 514, a video or image generation is triggered by the image capture device 500. The shutter button 514 may only activate the image capture device 500 while being depressed. The shutter button 514 may initiate detection and/or generation of a video or images for an entire duration that the shutter button 514 is depressed, and upon being released, image or video generation may cease. The shutter button 514 may initiate detection and/or generation of a video or images upon a first depression and may cease detection of video or images upon a second depression. Other depression sequences are also possible.

FIG. 6A is a front isometric view of an image head 600 and FIG. 6B is a rear isometric view of the image head 600. The image head 600 may be used with any of the bases 302, 402, or 502 taught herein and is interchangeable with any of the bases 302, 402, or 502. The image head 600 may be similar to or the same as any of the image heads 304, 404, or 504. Thus, a single image head 600 may be purchased that includes all of the componentry to detect, generate, and/or otherwise capture images and videos (not shown) and the image head 600 may be placed in different bases 302, 402, or 502 depending on a desire or need of a user. The image head 600 includes a housing 602.

The housing 602 includes four sides that include a first side 602A, a second side 602B, a third side 602C, and a fourth side 602D. The housing 602 as shown is square in shape; however, the housing 602 may have other shapes. The housing 602 may be round, oval, triangular, rectangular, pentagonal, hexagonal, heptagonal, octagonal, a geometric shape, a non-geometric shape, symmetrical, asymmetrical, or a combination thereof. The housing 602 may have a complementary shape to a shape of the cavities 324, 420 of the bases 302, 402, or 502 so that the image head 600 may be interchangeably moved between the bases 302, 402, or 502. The housing 602 includes rail alignment features 604 to assist in installing and removing the image head 600 from the bases 302, 402, and 502.

The rail alignment features 604 may include any feature that assists a user in properly installing the image head 600 within a base such as the bases 302, 402, or 502. The rail alignment features 604 may be a male feature, a female feature, or a combination of both. The rail alignment features 604 may be located on one or more sides, three or more sides, or four or more sides. Each side may include one or more rail alignment features 604 or two or more rail alignment features 604. The rail alignment features 604 may be located on opposing sides or adjacent sides. For example, the rail alignment features may be located on a first side 602A and a second side 602B (e.g., opposite) or a first side 602A and a third side 602C (e.g., adjacent). The rail alignment features 604 may extend substantially an axial length of the image head 600. The rail alignment features 604 may extend about 50 percent or more, 60 percent or more, or about 75 percent or more of an axial length of the image head 600. The rail alignment features 604 may be sufficiently long so that when installed the image head 600 is properly seated (e.g., connected) within the bases 302, 402, and 502. The rail alignment features 604 may act as a stop when then image head 600 is fully seated. For example, the rail alignment features may only permit the image head 600 to be inserted a predetermined distance to ensure proper seating, to protect elements of the image head 600, or both. The rail alignment features 604 as shown include first side rails 606A and second side rails 606B.

The first side rails 606A are located on the first side 602A (FIG. 6A) and the second side rails 606B are located on the second side 602B of the housing 602 (FIG. 6B). The first side rails 606A and the second side rails 606B extend in a parallel manner to one another. The first side rails 606A and the second side rails 606B may have a continuous width along a length. The first side rails 606A and the second side rails 606B may have a flare 608 to help receive a track or guide rail such as the track 326 shown in FIG. 3C. The flares 608 may assist in forming a blind connection (e.g., a connection where the user cannot see where the connection is occurring). The flares 608 may guide the track or tracks into the first side rails 606A or the second side rails 606B respectively. The flares 608 may be a first component that the tracks contact so that the tracks are guided into the first side rails 606A or the second side rails 606B respectively.

FIG. 6B illustrates the second side 602B of the image head 600 of FIG. 6A. As shown, the second side 602B includes the second side rails 606B, and the third side 602C and the fourth side 602D are free of side rails.

Figure 6C:
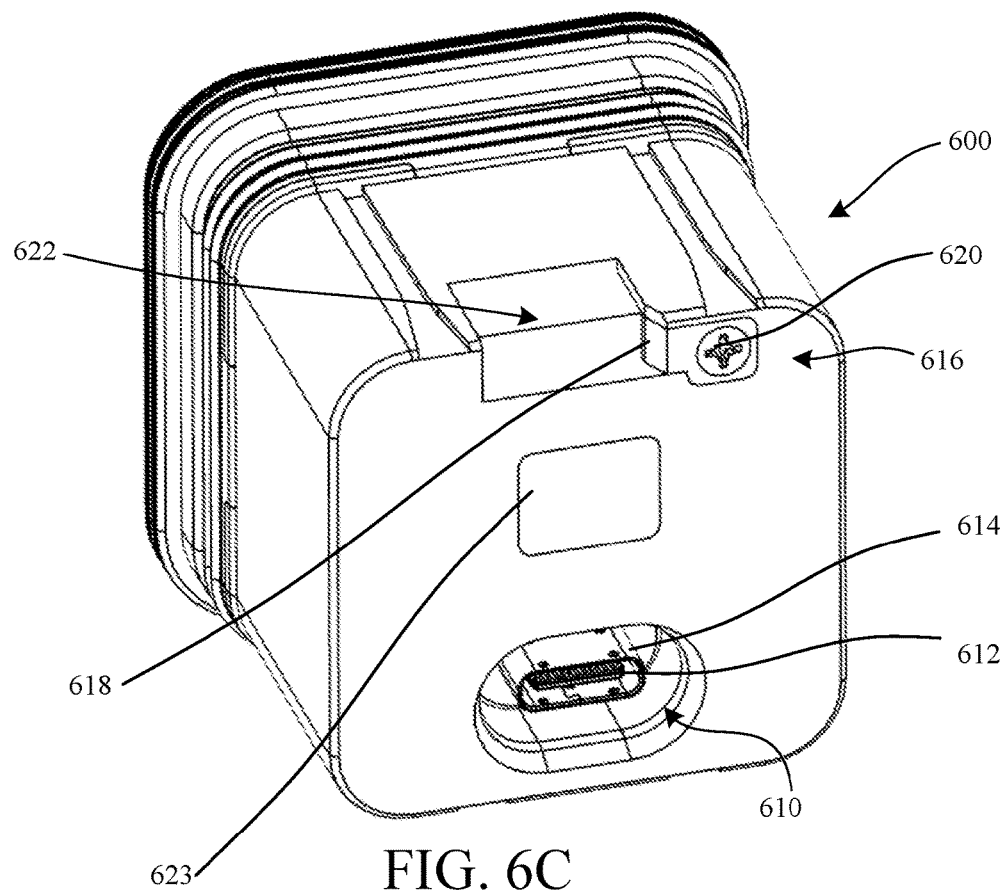
FIG. 6C is a rear isometric view of the image head of FIG. 6A.

FIG. 6C is a bottom isometric view of the image head 600 of FIGS. 6A and 6B. The bottom surface of the image head 600 includes a port 610. The port 610 is a connection point where the image head 600 connects to any base such as bases 302, 402, and 502 taught herein. The port 610 may be a recess that receives a portion of the bases 302, 402, or 502. The port 610 may have a portion that extends into the bases 302, 402, or 502. The port 610 may assist in forming an electrical connection, a connection where signals may pass to control the image head, or both. The port 610 may include any connection device to connect with the image head 600 so that the image head 600 may be used to detect, generate, and/or otherwise capture images (not shown). The port 610 may include a connection device such as a USB connector 612, however, other connection devices may be used such as the connection devices discussed herein with regard to the ports 314 or internal port 330.

The USB connector 612 functions to permit control of the image head 600 by any of the bases 302, 402, and 502 taught herein. The USB connector 612 may provide power, control, or both between the bases 302, 402, and 502 and the image head 600. The USB connector 612 may be any connection device taught herein. The USB connector 612 may extend as a cantilever into the port 610. The USB connector 612 may be supported by a seal 614.

The seal 614 may extend around all or a portion of the USB connector 612. The seal 614 may support the USB connector 612 so that when the image head 600 is forming a connection, the USB connector 612 is not bent or damaged. The seal 614 may be compliant so that as the image head 600 is being installed, the seal 614 may deform. The seal 614 may contact another seal (e.g., the seal 334 of FIG. 3C) in the base 302, 402, and 502. The seal 614 may extend from an interior location of the image head 600 to an exterior location of the image head 600 so that fluid is prevented from entering the image head 600. The seal 614 may surround a circumference of the USB connector 612 so that fluids are prevented from entering the image head 600 through a region around the USB connector 612. The seal 614 may be made of or include rubber, elastomer, plastic, polymer, silicone, or a combination thereof. A latch 616 may be located on a side of the image head 600 opposite the port 610.

The latch 616 functions to connect the image head 600 to the bases 302, 402, or 502 and prevents the image head 600 from being removed. The latch 616 removably forms a connection. The latch 616 may be a one-way latch that moves to form a connection when the image head 600 moves in a first direction and prevents removal when the image head 600 moves in second direction. The latch 616 may be any type of latch that forms a fixed connection. The latch 616 may move so as to rotate, fold, bend, be pressed in, or a combination thereof. The latch 616 may be rigid, spring, move, flex, or a combination thereof. The latch 616 may have a latch hook 618 that catches a portion (e.g., the locking switch covers 306, 406, or 506) of the bases 302, 402, or 502 to form a connection.

The latch hook 618 may move inward (e.g., into an extended position) as the image head 600 is inserted into one of the bases 302, 402, or 502. The latch hook 618 may prevent the image head 600 from being removed when the latch hook 618 is in a resting position where the locking switch covers (e.g., 306, 406, 506) and the latch hook 618 are in communication. The latch hook 618 may be static. The latch hook 618 may be movable between the resting position and the extended position. The latch hook 618 may be mono-stable and may always return to the resting position when no force is acting on the latch hook 618. The latch hook 618 may only move when a force is applied to the latch hook 618. The latch hook 618 may be released by one of the locking switch covers 306, 406, or 506 when one of the locking switches 308, 408, or 508 is actuated. The latch hook 618 may extend upward (e.g., from a bottom of the image head 600 towards a top of the image head 600). The latch hook 618 may be made of or include metal, plastic, polymer, rigid material, flexible material, stainless steel, spring steel, or a combination thereof. The latch hook 618 can be sufficiently flexible such that the latch hook 618 is movable to form a connection and then movable into an unbiased state when forces are removed by the image head 600 being in an installed position. The latch hook 618 may be connected to the image head 600 via a fastener 620 as shown or may be integral with the housing 602 (not shown).

The fastener 620 may fixedly connect the latch hook 618 to the image head 600. The fastener 620 may removably connect the latch hook 618 to the image head 600. The fastener 620 may extend into the image head 600. The fastener 620 may be any type of fastener that connects two parts together. The fastener 620 may be a/an screw, rivet, push pin, adhesive, weld, friction weld, over mold, or a combination thereof. The fastener 620 may be located proximate to a latching recess 622 and the latch hook 618 may extend into the latching recess 622.

The latching recess 622 functions to receive a portion of the bases 302, 402, or 502 so that a connection is formed with the latch hook 618. The locking switch covers 306, 406, or 506 may extend into the latching recess 622 and connect to the latch hook 618. The latching recess 622 permits movement of the latch hook 618, the locking switches 308, 408, 508, or both. The latching recess 622 is complementary in shape to a portion of the bases 302, 402, or 502 so that a connection may be formed.

A heat sink 623 is located on a bottom of the image head 600 to assist in removing heat from the image head 600 during operation. The heat sink 623 will contact a heat sink (such as the heat sink 332 of FIG. 3C) in one of the bases 302, 402, or 502 when the image head 600 is seated in one of the bases 302, 402, or 502.

Figure 6D:
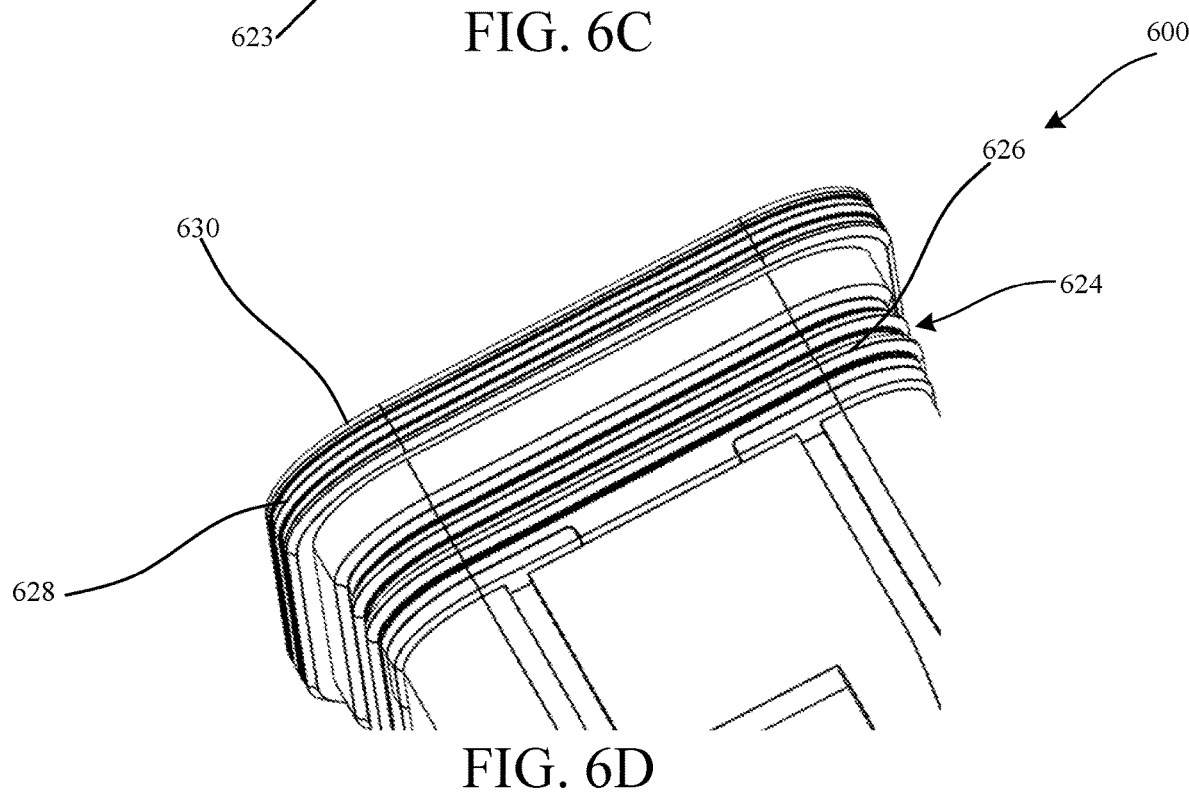
FIG. 6D is a close-up isometric view of a front edge of the image head of FIG. 6A.

FIG. 6D is an isometric partial view of a top of the image head 600 of FIG. 6A. The image head 600 includes an interference member 624. The interference member 624 creates an interference fit with any of the bases 302, 402, or 502 when the image head 600 extends into the cavity 324 or 420 to prevent fluid from entering into the cavity 324 or 420. The interference member 624 contacts a wall of the bases 302, 402, or 502. The interference member 624 may be compressible. The interference member 624 may have a size that is larger than a size of the cavities 324 or 420 such that the interference member 624 compresses to fit within the cavities 324 or 420. The interference member 624 may restrict the image head 600 from being removed. The interference member 624 may be made of or include a/an elastomer, rubber, polymer, silicone, or a combination thereof. The interference member 624 may include outer seals 626.

The outer seals 626 may be compressed to form the interference fit. The outer seals 626 may be a series of concentric rings that extend outward from a body of the interference member 624. The outer seals 626 may prevent water or other fluids from entering the image head 600 by creating a barrier. The outer seals 626 may project outward and then be compressed in the installed position. The outer seals 626 may be compressible, flexible, or both. The outer seals 626 may be a monolithic part of the interference member 624. The outer seals 626 may be located axially inward from a plurality of grooves 628.

The grooves 628 function to assist a user in removing the image head 600 from one of the bases 302, 402, or 502. The grooves 628 may extend around a circumference of a top of the image head 600. The grooves 628 may be a grip. The grooves 628 may extend horizontally or circumferentially. The grooves 628 may be one, two, three, or even four parallel grooves. The grooves 628 may be positioned outside of the bases 302, 402, or 502 when the image head 600 is fully installed. The grooves 628 may be located proximate to or be part of an external heat sink 630.

The external heat sink 630 functions to remove heat from the image head 600. The external heat sink 630 may be exposed to ambient air (or liquid) so that the ambient air removes heat or heat is transferred to the ambient air. The external heat sink 630 may be made of any material that transfers heat from the image head 600 to ambient air (or liquid). The external heat sink 630 may assist in balancing heat within the image head 600.

Figure 6E:
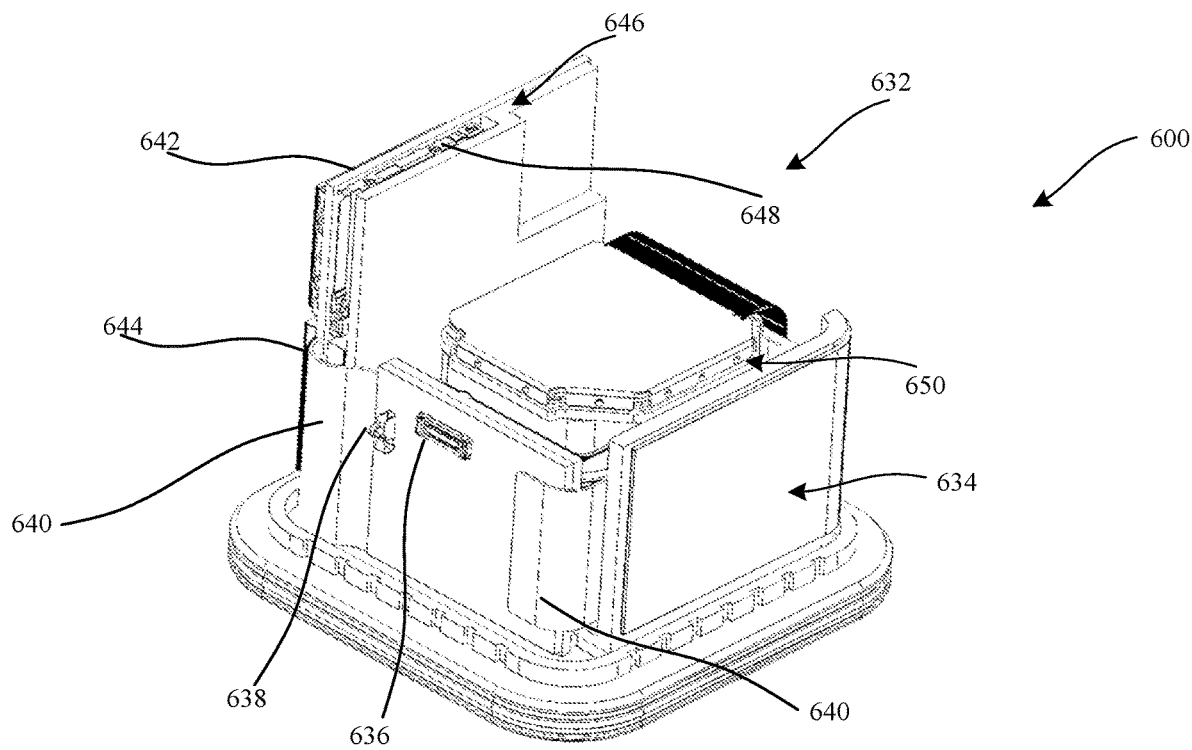
FIG. 6E is an isometric view of the image head of FIG. 6A with a housing removed.

FIG. 6E is an isometric view of the image head 600 of FIG. 6A with the housing removed so that internal componentry 632 is exposed. The internal componentry 632 can run the image head 600 without any additional components. The internal componentry 632 may include all functionality needed to detect, generate, and/or otherwise capture images or videos. The internal componentry 632 may only operate for a short period of time (e.g., 20 minutes or less, 10 minutes or less, or 5 minutes or less) without an additional power source. The internal componentry 632 may be free of a power source. The internal componentry 632 may include a printed circuit board 634.

The printed circuit board (PCB) 634 operates to support and connect the internal componentry 632. The PCB 634 may be rigid. The PCB 634 may be flexible. The PCB 634 may be one or more parts. The PCB 634 may include or be connected to a system on chip (SOS), an embedded multimedia card (eMMC), or both. The PCB 634 may support, have a cable connection that extends to, or include a USB connector 636.

The USB connector 636 may supply power to the PCB 634, support communication to/from the internal componentry 632, or both. The USB connector 636 may carry information that actuates or permits the internal componentry 632 to detect, generate, and/or otherwise capture images and/or videos. The USB connector 636 may connect the image head 600 to one of the bases 302, 402, or 502. The USB connector 636 may be any connection device taught herein.

The internal componentry 632 may include a wireless antenna contact 638 (e.g., a WIFI antenna contact). The wireless antenna contact 638 functions to permit wireless communication between the image head 600 and other wireless-enabled devices such as a WIFI-enabled device (e.g., a phone, computer, tablet, kiosk). The wireless antenna contact 638 may contact a wall of the housing 602 (see FIGS. 6A to 6B) to support emission of wireless communications.

An end of the PCB 634 includes a PCB connector 640 that connect two or three adjacent panels of the PCB 634 together. The PCB connector 640 may allow the PCB 634 to move and flex while maintaining functionality of the PCB 634. The PCB connector 640 may be a flexible joint. The PCB connector 640 may allow signals, power, or both to move between panels of the PCB 634. One panel of the PCB 634 includes a wireless-enabled device 642.

The printed circuit board (PCB) 634 may be connected to or include one or more power management integrated circuits (PMIC) (not shown). The PMIC may regulate power within the image head 600. The PMIC may include a battery (not shown). The PMIC may power the image head 600 when the image head is removed from the image capture device 300, 400, or 500.

The wireless-enabled device 642 may be a card, a component on the PCB 634, or a component that is electrically connected to the PCB 634. The wireless-enabled device 642 may work with the wireless antenna contact 638 to create wireless communication. The wireless-enabled device 642 may wirelessly communicate with another WIFI-enabled device (not shown). The wireless-enabled device 642 may pass information from a memory 644 to another device.

The memory 644 may be any memory that is capable of storing images, videos, audio, or a combination thereof. The memory 644 may be RAM, ROM, or flash memory. The memory 644 may be removable. The memory 644 may be both a fixed memory and a removable memory. The memory 644 may include a receptacle 646 that receives a card 648 (e.g., an SD card).

The receptacle 646 may permit for the card 648 to be optionally installed, for example, to expand or upgrade the memory 644. For example, the card 648 can be removed and used with a different device (not shown). The receptacle 646 and the card 648 may be sealed within the image head 600 such that an only time the card 648 may be integrated or changed is during installation. The card 648 may make each image head 600 adaptable to support different sizes and shapes. The receptacle 646 and the card 648 are in communication with the optical system 650.

The optical system 650 is any optical system that can detect, generate, and/or otherwise capture images, videos, or both. The optical system 650 includes every component needed to detect, generate, and/or otherwise capture images, videos, or both. The optical system 650 is entirely contained within the image head 600. The optical system 650 is shown in more detail in the cross-sectional view of FIG. 6F.

Figure 6F:
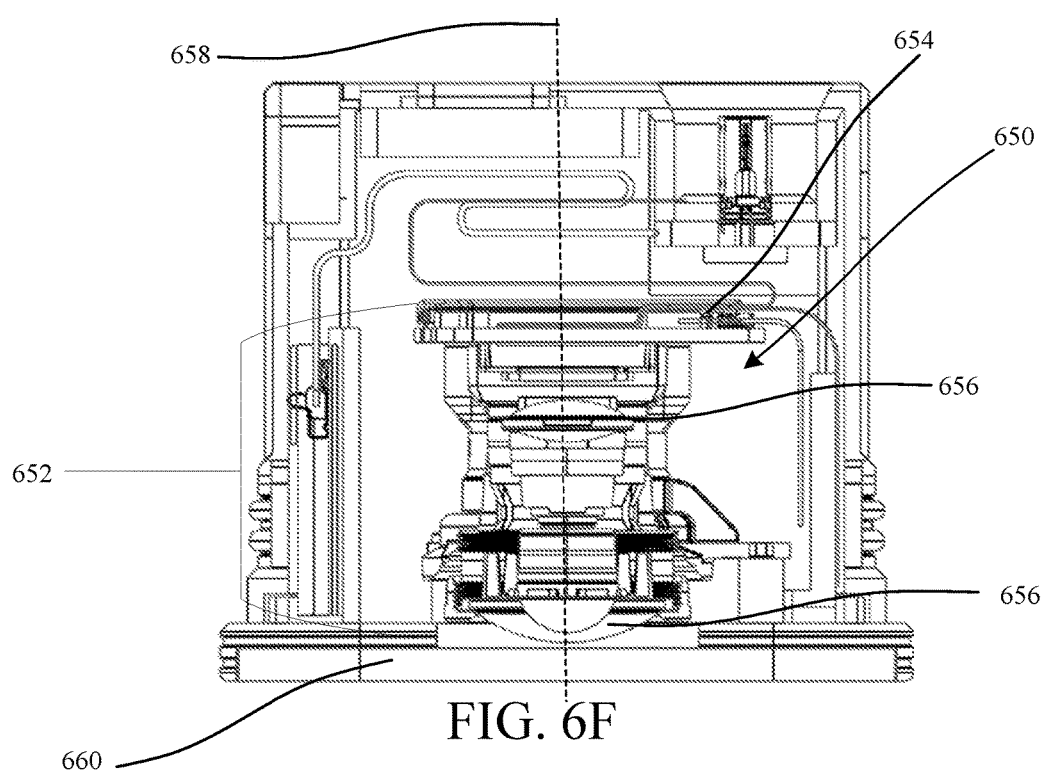
FIG. 6F is a cross-sectional view of the image head of FIG. 6A along lines VIF-VIF.

FIG. 6F is a cross-sectional view of FIG. 6A along lines VIF-VIF. The optical system 650 is an integrated sensor and lens assembly (ISLA) 652. The ISLA 652 has a length as shown. The ISLA 652 includes a sensor 654.

The sensor 654 can detect, generate, and/or otherwise capture the images or videos. The sensor 654 may be any sensor that is used in a camera to detect, generate, and/or otherwise capture images or videos. The sensor 654 may be aligned with one or more lenses 656.

The lenses 656 may be any lens that functions to focus light reflected from an item of interest so that the item of interest may be detected, captured, or recorded. The lenses 656 may include features such as magnification (e.g., zoom), wide angle, color, filtering, or a combination thereof. There may be one or more, two or more, three or more, or even four or more lenses 656. The lenses 656 may be fixed lenses. The lenses 656 may all extend along an optical axis 658. The optical axis 658 may extend through the sensor 654 and the lenses 656. The optical axis 658 may extend through the ISLA 652 and a lens 660.

The lens 660 may be an outermost lens. The lens 660 may create a seal. The lens 660 may protect the lenses 656 and the internal componentry 632 within the image head 600. The lens 660 may provide a waterproof seal.

Figure 7A:
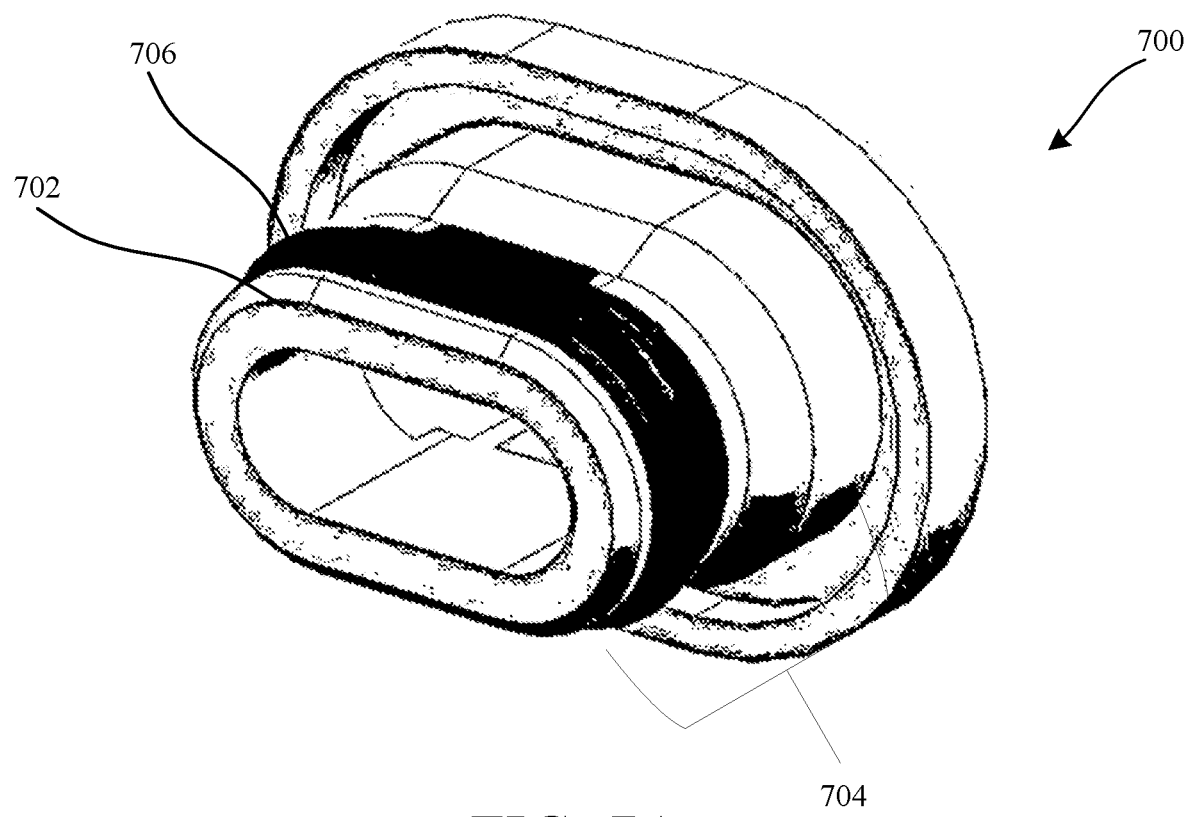
FIG. 7A is a front isometric view of a seal.

FIG. 7A is a front perspective view of a connector cover 700. The connector cover 700 functions to assist in providing waterproofing to the image heads 304, 404, 504, or 600; the bases 302, 402, or 502; or both. The connector cover 700 may providing such waterproofing to the image heads 304, 404, 504, or 600; the bases 302, 402, or 502; or both when the image heads 304, 404, 504, or 600; the bases 302, 402, or 502; or both are connected together.

The connector cover 700 includes a lip 702 that that abuts or sits on an inside of any of the image heads 304, 404, 504, or 600; the bases 302, 402, or 502; or both. The lip 702 prevents the connector cover 700 from being removed. The lip 702 may provide waterproofing to any of the cavities 324 or 420 of the bases 302, 402, or 502. The lip 702 may extend radially outward. The lip 702 may form a rear wall of the connector cover 700. A projection 704 extends outward from the lip 702.

The projection 704 extends into any of the cavities 324 or 420, around an internal port (e.g., such as the internal ports 330 or 422 that include a USB connector), or both. The projection 704 extends through a wall of any of the cavities 324 or 420 to prevent fluid from entering through the wall. The projection 704 may be substantially rigid and free of any compressibility. The projection 704 may prevent the USB connector 612 from bending or flexing. The projection 704 may support the USB connector 612 while a connecting is being created. The projection 704 may be compressible or have some compressibility so that a connector, such as the USB connector 612, may form a connection with the internal ports 330 or 422. The projection 704 may surround all or a portion of the USB connector 612, the internal ports 330 or 422, or both. The projection 704 may form a supportive sleeve around the USB connector 612, the internal ports 330 or 422, or both. The projection 704 may support a seal 706.

The seal 706 may extend around the projection 704 and be located behind the lip 702. The lip 702 may retain the seal 706 on the connector cover 700. The seal 706 may be malleable. The seal 706 may compress and deform so that a seal is formed between the connector cover 700 and adjacent internal ports 330 or 422. The seal 706 may be made of or include rubber, an elastomer, silicone, or a combination thereof. The seal 706 may be an O-ring.

Figure 7B:
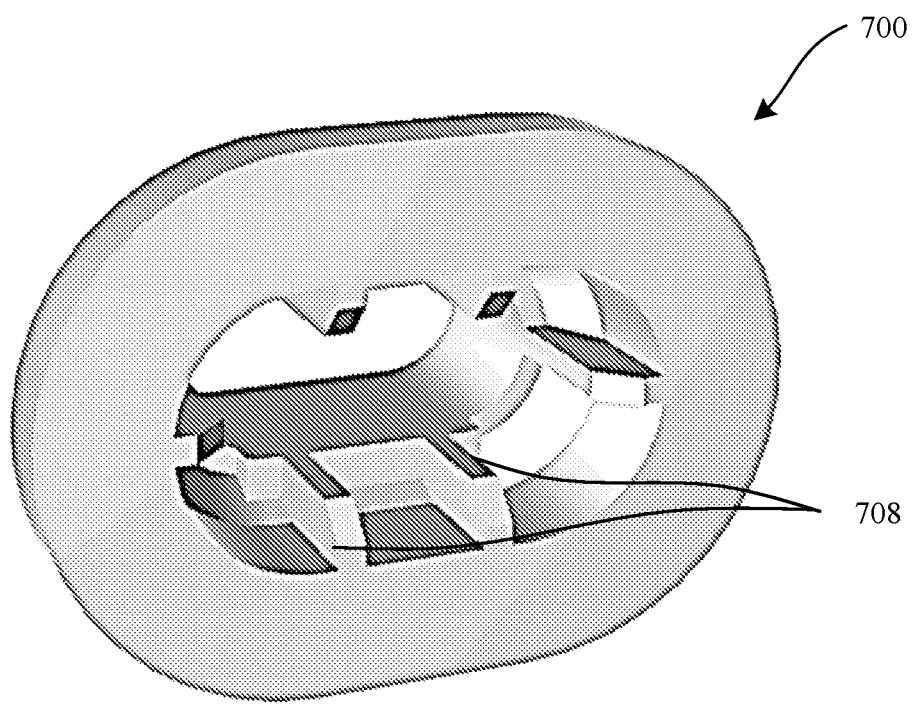
FIG. 7B is a rear isometric view of the seal of FIG. 7A.

FIG. 7B is a rear perspective view of the connector cover 700 of FIG. 7A. The connector cover 700 includes ribs 708. The ribs 708 may form a fit with the USB connector 612, the internal ports 330 or 422, or both. The ribs 708 may provide rigidness to the connector cover 700. The ribs 708 may create radial stiffness, longitudinal stiffness, axial stiffness, or a combination thereof. The ribs 708 may prevent the USB connector 612, the internal ports 330 or 422, the connector cover 700, or a combination thereof from bending.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image head comprising:
    a housing comprising:
       a front side;
       a rear side located opposite the front side;
       a top side located between the front side and the rear side; and
       a bottom side located opposite the top side and between the front side and the rear side;
    an outer lens that seals to the front side of the housing to form a waterproof seal;
    a latch, located on the rear side, configured to fixedly connect the image head to a base when the image head is inserted into the base so that the image head is prevented from being removed from the base;
    an integrated sensor and lens assembly (ISLA) that is aligned with and extends along an optical axis from the outer lens at the front side of the housing toward the rear side, wherein the ISLA is configured to detect images with the integrated sensor;
    a port located on the rear side that is configured to electrically connect the image head to the base when the image head is inserted into the base; and
    internal componentry comprising:
       two printed circuit boards in communication with an integrated sensor of the ISLA, wherein a first of the two printed circuit boards is located outside of the optical axis of the ISLA;
       a battery that is configured to power the image head; and
       a memory located on a first or a second of the two printed circuit boards and configured to store the images, wherein the internal componentry controls the image head so that the image head is configured to operate independent of the base.

2. The image head of claim 1, wherein the housing comprises:
    a left side located between the front side and the rear side and extending from the top side to the bottom side, wherein the left side is free of side rails.

3. The image head of claim 2, wherein the housing comprises:
    a right side located opposite the left side, the right side being located between the front side and the rear side and extending from the top side to the bottom side, wherein the right side is free of side rails.

4. The image head of claim 3, further comprising:
    an interference member that extends around the housing.

5. The image head of claim 4, wherein the housing comprises:
    a left side and a right side located opposite the left side, the right side and the left side extending between the top side and the bottom side,
    wherein the interference member extends around the top side, the bottom side, the left side, and the right side of the housing.

6. The image head of claim 5, wherein the latch is fixed to the image head and is configured to releasably connect to a locking switch of the base when the image head is connected to the base so that the image head is connected to the base.

7. The image head of claim 2, wherein the internal componentry further comprises a wireless enabled device.

8. The image head of claim 1, further comprising:
    a wireless-enabled device that is configured to wirelessly provide information to another device.

9. The image head of claim 8, wherein the wireless-enabled device extends parallel to the optical axis.

10. An image capture device comprising:
    a base comprising:
       a cavity and an internal port located within the cavity; and
       a speaker located adjacent to the cavity; and
    an image head comprising:
       an optical axis;
       a housing having a shape that is complementary in shape to the cavity so that the image head is insertable into the cavity along the optical axis, the housing comprising:
          a first side; and a second side located opposite the first side;
a port configured to electrically connect the image head to the internal port of the base, wherein the port is located on the second side of the housing and connects to the internal port as the image head extends into the cavity along the optical axis; and
internal componentry comprising:
a printed circuit board;
an integrated sensor and lens assembly (ISLA) configured to detect images, wherein the ISLA extends through the first side of the housing; and
a memory located on the printed circuit board and configured to store the images,
wherein the base is free of any circuitry that detects the images.

11. The image capture device of claim 10, wherein the housing comprises:
a third side located opposite a fourth side, the third side and the fourth side being located between the first side and the second side, wherein the third side and the fourth side are free of side rails.

12. The image capture device of claim 11, wherein the base comprises a screen, ports, a shutter button, and a battery.

13. The image capture device of claim 11, wherein the internal componentry within the image head controls image detection and display generation, and wherein the base provides a support for the image head during image generation.

14. The image capture device of claim 13, wherein the image head comprises a latch that connects the image head to the base when the image head is in communication with the base, and wherein the base comprises a locking switch that connects to the latch so that the image head is releasably connected to the base via the locking switch.

15. The image capture device of claim 13, wherein the internal componentry further comprises a wireless enabled device.

16. An image capture device comprising:
a base comprising:
a power source;
a shutter button;
a cavity;
a speaker located on a different wall of the base than the cavity;
an internal port located within the cavity; and
a locking switch located within the cavity adjacent to the internal port; and
an image head comprising:
a housing comprising:
a first side;
a second side located opposite the first side;
a port configured to electrically connect the image head to the internal port of the base, wherein the port is located on the second side of the housing;
a latch located on the second side of the housing and configured to removably connect to the locking switch when the image head is inserted into the cavity;
an interference member that extends around an outer surface of the image head and extends into the cavity of the base, wherein the interference member is made of or includes an elastomer, rubber, polymer, silicone, or a combination thereof; and
internal componentry comprising:
a printed circuit board;
an integrated sensor and lens assembly (ISLA) configured to detect images, wherein the ISLA extends through the first side of the housing; and
a memory located on the printed circuit board and configured to store the images.

17. The image capture device of claim 16, wherein the base is free of any circuitry that captures the images.

18. The image capture device of claim 16, wherein the base further comprises:
a display located on a rear surface of the base opposite the cavity.

19. The image capture device of claim 18, wherein the speaker is located on a rear side of the base, wherein the rear side is opposite a front side of the base that includes the cavity.

20. The image capture device of claim 19, wherein the internal componentry further comprises a wireless data interface.

* * * * *